United States Patent
Nishimoto et al.

(10) Patent No.: US 7,096,664 B2
(45) Date of Patent: Aug. 29, 2006

(54) INTERNAL COMBUSTION ENGINE

(75) Inventors: Seiji Nishimoto, Wako (JP); Tsuyoshi Baba, Wako (JP); Kazuya Takahashi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/470,081

(22) PCT Filed: Jan. 21, 2002

(86) PCT No.: PCT/JP02/00383

§ 371 (c)(1),
(2), (4) Date: Feb. 27, 2004

(87) PCT Pub. No.: WO02/059467

PCT Pub. Date: Aug. 1, 2002

(65) Prior Publication Data

US 2004/0128990 A1    Jul. 8, 2004

(30) Foreign Application Priority Data

Jan. 26, 2001    (JP)    ............................. 2001-019104

(51) Int. Cl.
*F01N 3/10* (2006.01)
(52) U.S. Cl. ............................. 60/302; 60/298; 60/320; 60/321; 165/51; 165/156; 165/163
(58) Field of Classification Search .................. 60/298, 60/302, 320, 321, 323; 165/51, 146, 156, 165/163
See application file for complete search history.

(56) References Cited

U.S. PATENT DOCUMENTS

| | | | | |
|---|---|---|---|---|
| 3,669,630 | A | * | 6/1972 | Filatov et al. .............. 422/169 |
| 4,091,616 | A | * | 5/1978 | Loweg ......................... 60/295 |
| 4,426,844 | A | * | 1/1984 | Nakano ....................... 60/295 |
| 5,033,264 | A | * | 7/1991 | Cabral ......................... 60/274 |
| 5,272,874 | A | * | 12/1993 | Paas ............................ 60/297 |
| 6,511,355 | B1 | * | 1/2003 | Woodward ............... 440/89 H |
| 6,823,668 | B1 | * | 11/2004 | Endoh et al. ................. 60/320 |
| 6,832,475 | B1 | * | 12/2004 | Tanaka et al. ................ 60/298 |

FOREIGN PATENT DOCUMENTS

DE    198 17 342 A1    11/1998

(Continued)

*Primary Examiner*—Binh Q. Tran
(74) *Attorney, Agent, or Firm*—Birch, Stewart, Kolasch & Birch, LLP

(57) ABSTRACT

An internal combustion engine is provided in which the temperature of an exhaust gas gradually decreases from its upstream side to its downstream side, and the temperature of a working medium of a heat exchanger, which flows in the opposite direction to the exhaust gas, gradually increases from its upstream side to its downstream side. The temperature difference between the exhaust gas temperature and the working medium temperature is the smallest at the interface between a liquid phase region and a two-phase region of the working medium, and since a catalyst device is incorporated at the upstream side, relative to the flow of exhaust gas, of the vicinity of the position where the temperature difference is the smallest, it is therefore possible for the heat exchanger to utilize the heat generated by the catalyst device effectively. Since the catalyst device is disposed in the two-phase region of the working medium, in which the temperature is constant, and this constant temperature is a temperature at which the catalyst is active, the catalyst can exhibit a stable exhaust gas purification performance.

17 Claims, 20 Drawing Sheets

FOREIGN PATENT DOCUMENTS

| | | |
|---|---|---|
| EP | 1 033 481 A1 | 9/2000 |
| EP | 1 249 584 A1 | 10/2002 |
| JP | 60-93110 A | 5/1985 |
| JP | 60093110 | 5/1985 |
| JP | 05256162 | 5/1993 |
| JP | 5-256162 A | 10/1993 |
| JP | 2000-45764 A | 2/2000 |

\* cited by examiner

US 7,096,664 B2

INTERNAL COMBUSTION ENGINE

This application is the national phase under 35 U.S.C. §371 of PCT International Application No. PCT/JP02/00383 which has an International filing date of Jan. 21, 2002, which designated the United States of America.

FIELD OF THE INVENTION

The present invention relates to an internal combustion engine in which a heat exchanger having a catalyst device integrally provided therewithin is disposed in an exhaust passage, the heat exchanger carrying out heat exchange between an exhaust gas and a working medium, and the catalyst device purifying the exhaust gas.

BACKGROUND ART

It is well known that a catalyst of an exhaust gas purification system has a certain temperature region in which its exhaust gas purification performance is exhibited effectively. For example, in a case where the catalyst cannot exhibit sufficient performance because its temperature is less than a temperature at which the catalyst is active, the catalyst temperature is increased to a temperature at which the catalyst is active by placing the exhaust gas purification system in a position at the most upstream side of an exhaust passage, where the temperature of the exhaust gas is high; heating the exhaust gas purification system by means of an electric heater; or heating the exhaust gas purification system with a combustion gas generated in a combustor heater. On the other hand, when the catalyst temperature of the exhaust gas purification system increases beyond a catalyst degradation temperature, since the catalyst is degraded and the exhaust gas purification performance is lowered, the air-fuel ratio of the internal combustion engine is made richer than the theoretical air-fuel ratio, and the catalyst is cooled by utilizing the heat of vaporization of unburned fuel, thereby maintaining the catalyst temperature at less than the catalyst degradation temperature.

Furthermore, Japanese Patent Application Laid-open No. 60-93110 discloses an internal combustion engine having an exhaust gas purification system provided in an exhaust passage, a heat exchanger being disposed in each of the exhaust passage on the upstream side of the exhaust gas purification system and the exhaust passage on the downstream side thereof, thereby achieving a balance between the temperature performance of the exhaust gas purification system and the waste heat recovery performance of the heat exchangers.

Placing the exhaust gas purification system in the position at the most upstream side of the exhaust passage in order to maintain the catalyst temperature at the temperature at which the catalyst is active causes the problem that the exhaust gas purification system interferes with an internal combustion engine body or its auxiliary equipment, and the layout is difficult. Providing an electric heater or a combustor heater requires extra thermal energy, thus causing the problem that the overall energy consumption of the system increases. On the other hand, making the gas mixture rich and cooling the catalyst by means of the heat of vaporization of excess fuel in order to maintain the catalyst temperature at less than the catalyst degradation temperature causes the problem of high fuel consumption.

Moreover, in the arrangement disclosed in Japanese Patent Application Laid-open No. 60-93110, it is inherently difficult to control the catalyst temperature automatically. Since the heat exchanger provided in the exhaust passage on the upstream side of the catalyst acts as extra thermal capacity, the thermal energy of the exhaust gas is absorbed by the heat exchanger when starting the internal combustion engine from cold, and the temperature of the catalyst provided on the downstream side of the heat exchanger cannot be increased rapidly to the temperature at which the catalyst is active. On the other hand, when the catalyst temperature exceeds the catalyst degradation temperature, since the heat exchanger on the upstream side of the catalyst carries out heat exchange between the exhaust gas and the working medium to decrease the temperature of the exhaust gas, and this cooled exhaust gas cools the catalyst to a temperature below the catalyst degradation temperature, there is the problem that the temperature responsiveness of the catalyst is poor and rapid temperature control is difficult.

Furthermore, although the catalyst generates heat in an exhaust gas purification reaction, in the arrangement disclosed in Japanese Patent Application Laid-open No. 60-93110 the heat generated by the catalyst in the exhaust gas purification reaction is not utilized effectively in the heat exchanger.

DISCLOSURE OF THE INVENTION

The present invention has been accomplished in view of the above-mentioned circumstances, and it is an object of the present invention to provide an internal combustion engine in which a heat exchanger having a catalyst device integrally provided therewithin is disposed in an exhaust passage, the heat generated by the catalyst device being utilized effectively in the heat exchanger and the catalyst temperature being maintained appropriately, thereby improving the exhaust gas purification performance.

In order to accomplish this object, in accordance with a first aspect of the present invention, there is proposed an internal combustion engine in which a heat exchanger having a catalyst device integrally provided therewithin is arranged in an exhaust passage, the heat exchanger carrying out heat exchange between an exhaust gas and a working medium, and the catalyst device purifying the exhaust gas, characterized in that the catalyst device is disposed in a region where the temperature of the exhaust gas is higher than a temperature at which the catalyst is inactive, the region being in the vicinity of a position within the heat exchanger where the difference in temperature between the exhaust gas and the working medium is the smallest.

In accordance with this arrangement, since the catalyst device is disposed in the vicinity of the position within the heat exchanger where the difference in temperature between the exhaust gas and the working medium is the smallest, the heat of reaction generated by the catalyst device can be transferred effectively to the working medium of the heat exchanger in a part in which the heat exchange efficiency of the heat exchanger is the lowest, and the performance of the heat exchanger can be improved by utilizing effectively the heat of reaction generated by the catalyst device. Moreover, since the catalyst device is disposed in the region where the temperature of the exhaust gas is higher than the temperature at which the catalyst is inactive, the exhaust gas purification performance can be improved.

Furthermore, in accordance with a second aspect of the present invention, in addition to the first aspect, there is proposed an internal combustion engine wherein the catalyst device is disposed on the upstream side, relative to the direction of exhaust gas flow, of the position where the difference in temperature between the exhaust gas and the working medium is the smallest.

In accordance with this arrangement, since the catalyst device is disposed on the upstream side of the position where the difference in temperature between the exhaust gas and the working medium is the smallest, the heat of reaction generated by the catalyst device can be made to act effectively on the position where the difference in temperature between the exhaust gas and the working medium is the smallest, which is downstream of the catalyst device, thereby optimizing the performance of the heat exchanger.

Moreover, in accordance with a third aspect of the present invention, in addition to the first aspect, there is proposed an internal combustion engine wherein the catalyst device is disposed in a two-phase region of the working medium.

In accordance with this arrangement, since the catalyst device is disposed in the two-phase region of the working medium, in which the temperature is maintained constant, it is possible to stabilize the catalyst temperature, thus reliably preventing the catalyst temperature from dropping to the temperature at which the catalyst is inactive or rising to the catalyst degradation temperature.

A first stage heat exchanger H1 to a fifth stage heat exchanger H5 of an embodiment correspond to the heat exchanger of the present invention, and a first stage metal catalyst device 46A to a fourth stage metal catalyst device 46D of the embodiment correspond to the catalyst device of the present invention.

BRIEF DESCRIPTION OF THE DRAWINGS

FIG. 1 to FIG. 20 illustrate embodiments of the present invention;

FIG. 1 is a longitudinal cross section of a cylinder head part of an internal combustion engine;

FIG. 2 is an enlarged cross section of an essential part of FIG. 1;

FIG. 3 is an enlarged view of part 3 in FIG. 2;

FIG. 4 is a view from the arrowed line 4—4 in FIG. 3;

FIG. 5 is a view from the arrowed line 5—5 in FIG. 3;

FIG. 6 is a view from the arrowed line 6—6 in FIG. 3;

FIG. 7 is a view from the arrowed line 7—7 in FIG. 3;

FIG. 8 is a cross section along line 8—8 in FIG. 4;

FIG. 9 is a cross section along line 9—9 in FIG. 2;

FIG. 10 is a cross section along line 10—10 in FIG. 2;

FIG. 11 is an enlarged view of an essential part of FIG. 2;

FIG. 12 is an enlarged view of part 12 in FIG. 9;

FIG. 14 is an exploded perspective view of a metal catalyst device and a third stage heat exchanger;

FIG. 15 is a schematic view showing a water supply route of an evaporator;

FIG. 16 is a diagram for explaining a position where the temperature difference is the smallest and a position where a metal catalyst device is placed;

FIG. 17 is a diagram showing positions where metal catalyst devices of embodiments and comparative examples are placed;

FIG. 18 is a diagram showing positions where an exhaust gas temperature, a water temperature, and a catalyst temperature are measured;

FIG. 19 is a graph showing how the amount of heat gained by the water changes depending on the presence or absence of the catalyst device; and FIG. 20 is a graph showing how the catalyst temperature changes depending on the amount of water supplied.

BEST MODE FOR CARRYING OUT THE INVENTION

Embodiments of the present invention are explained below by reference to the attached drawings.

Figure 1:
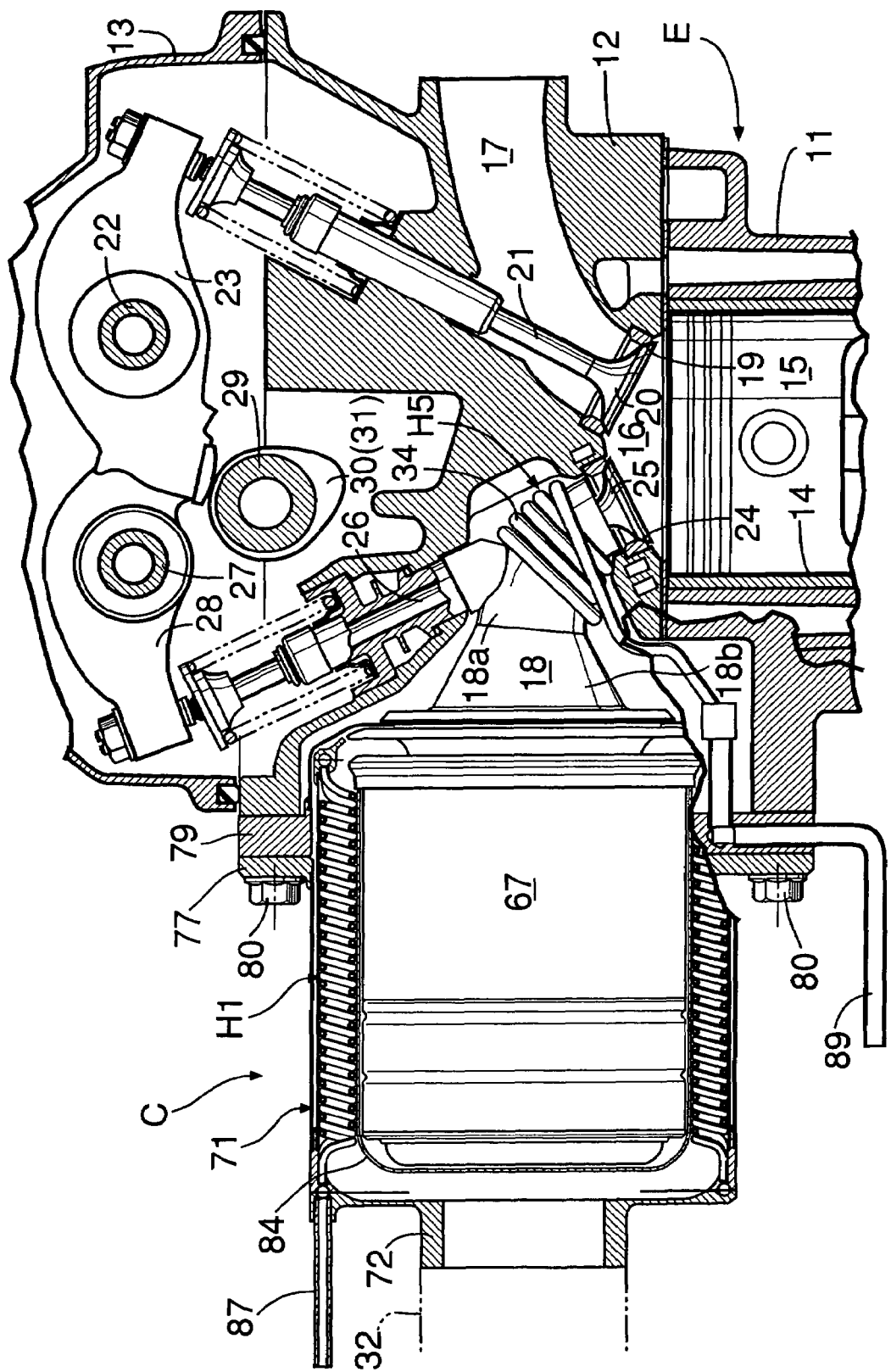
Figure 2:
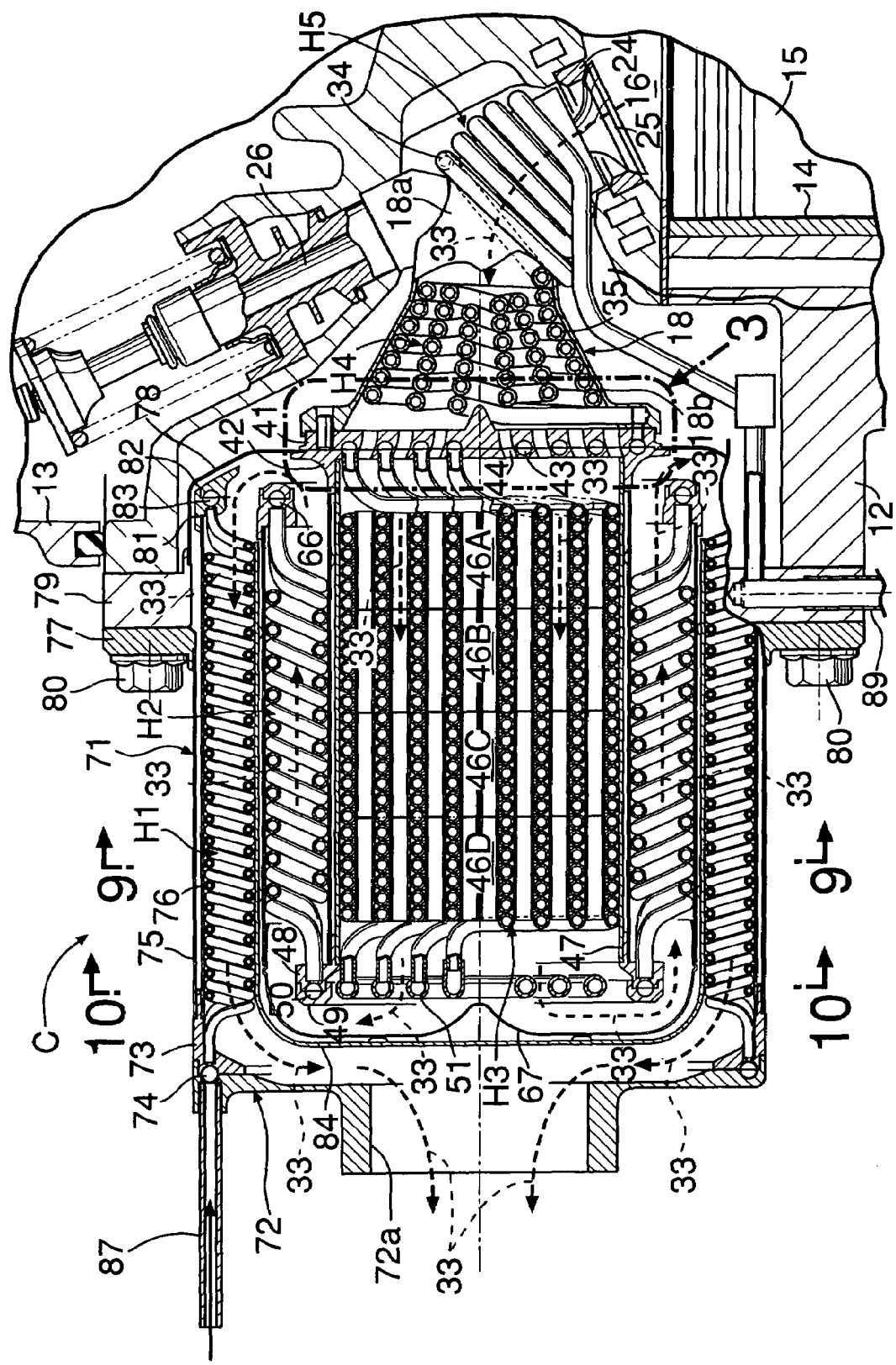
Figure 3:
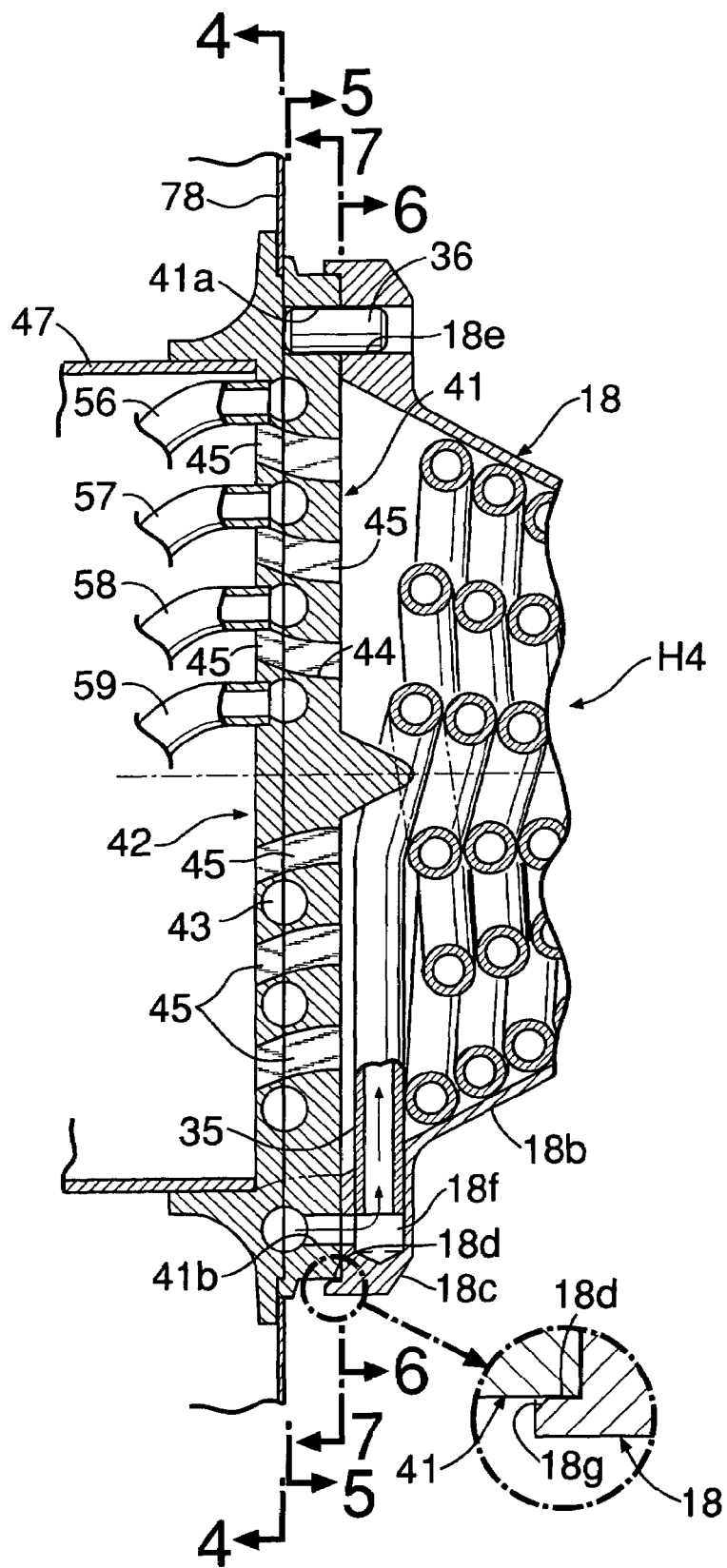
Figure 4:
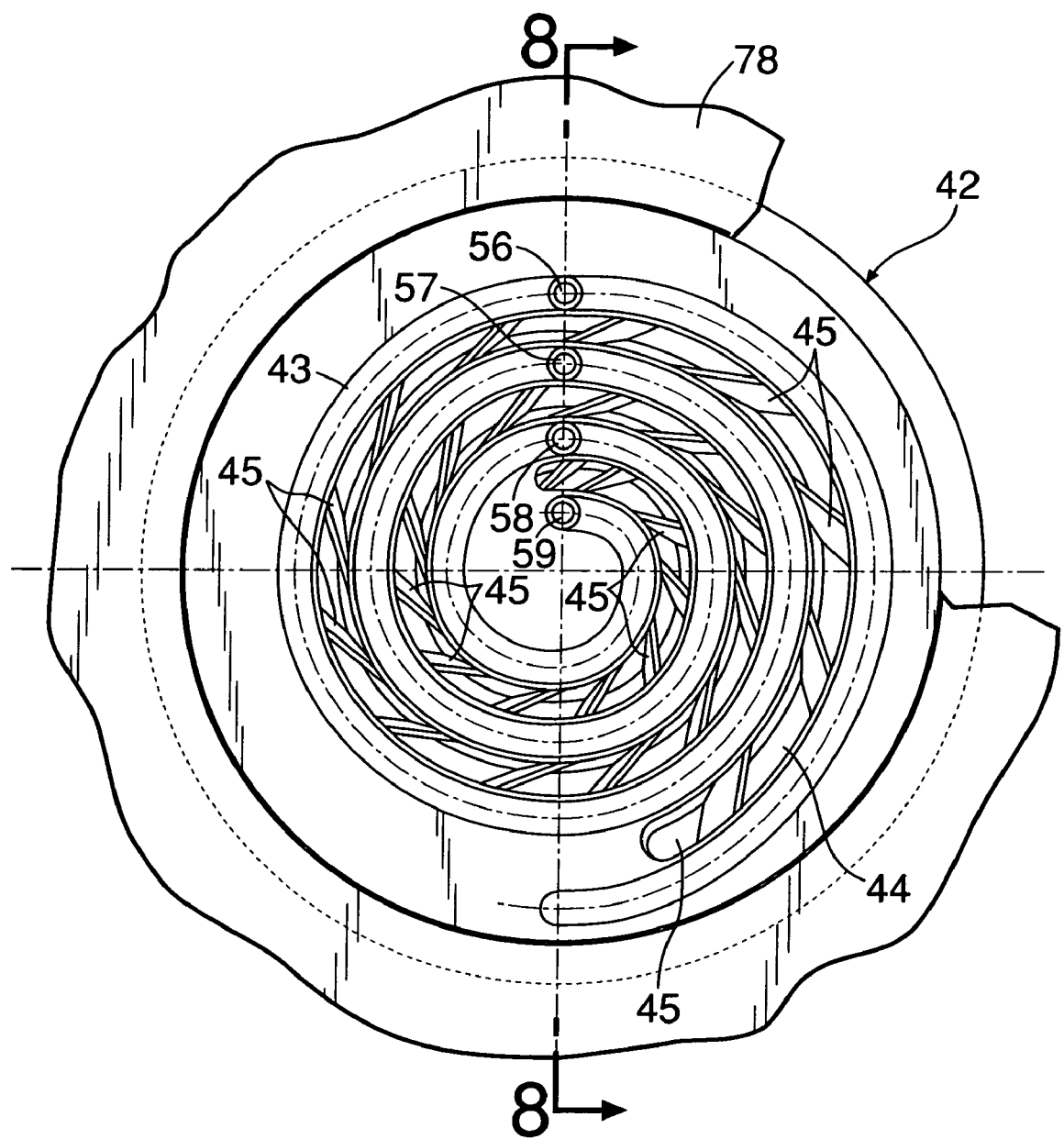
Figure 5:
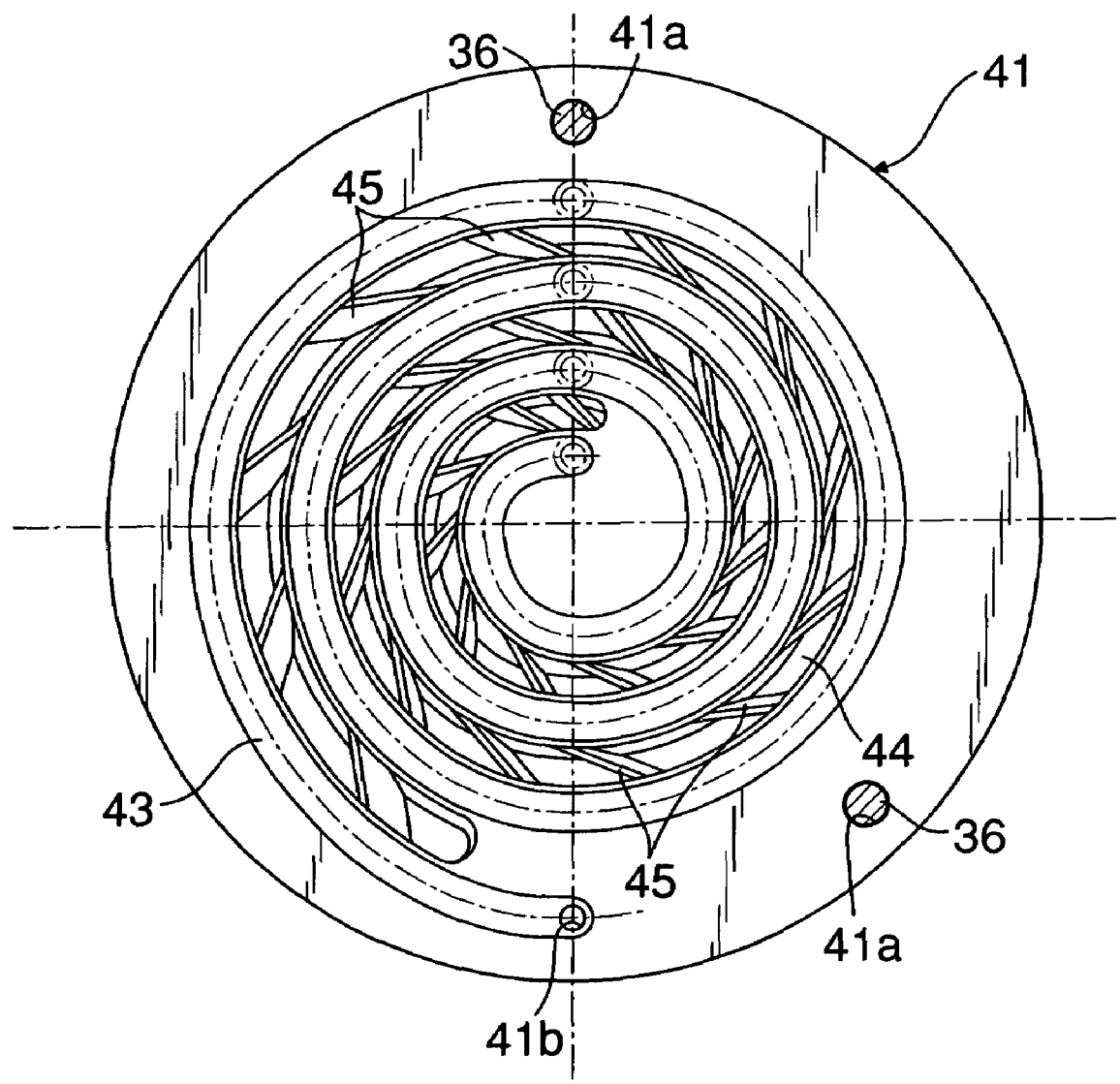
Figure 6:
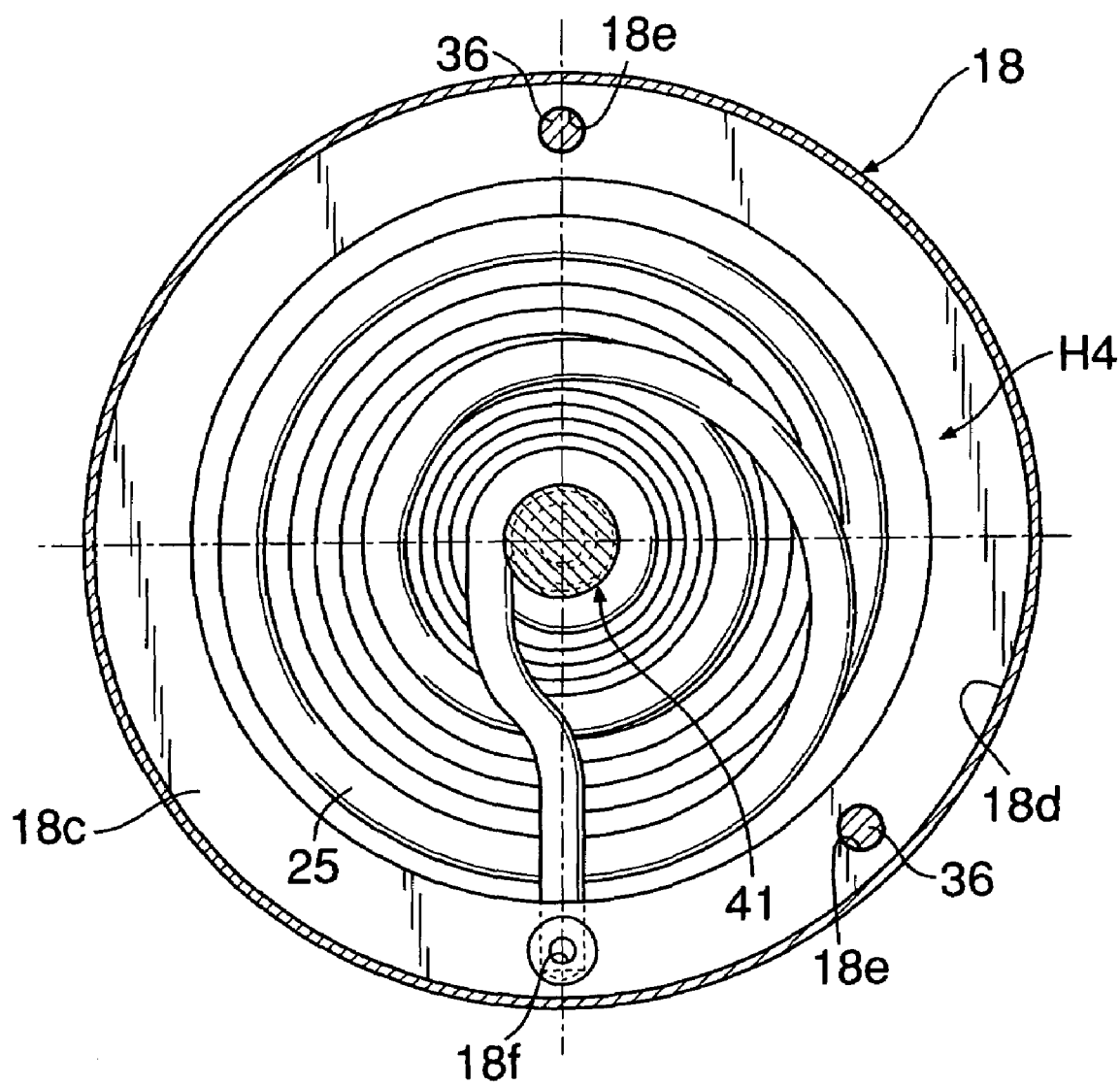
Figure 7:
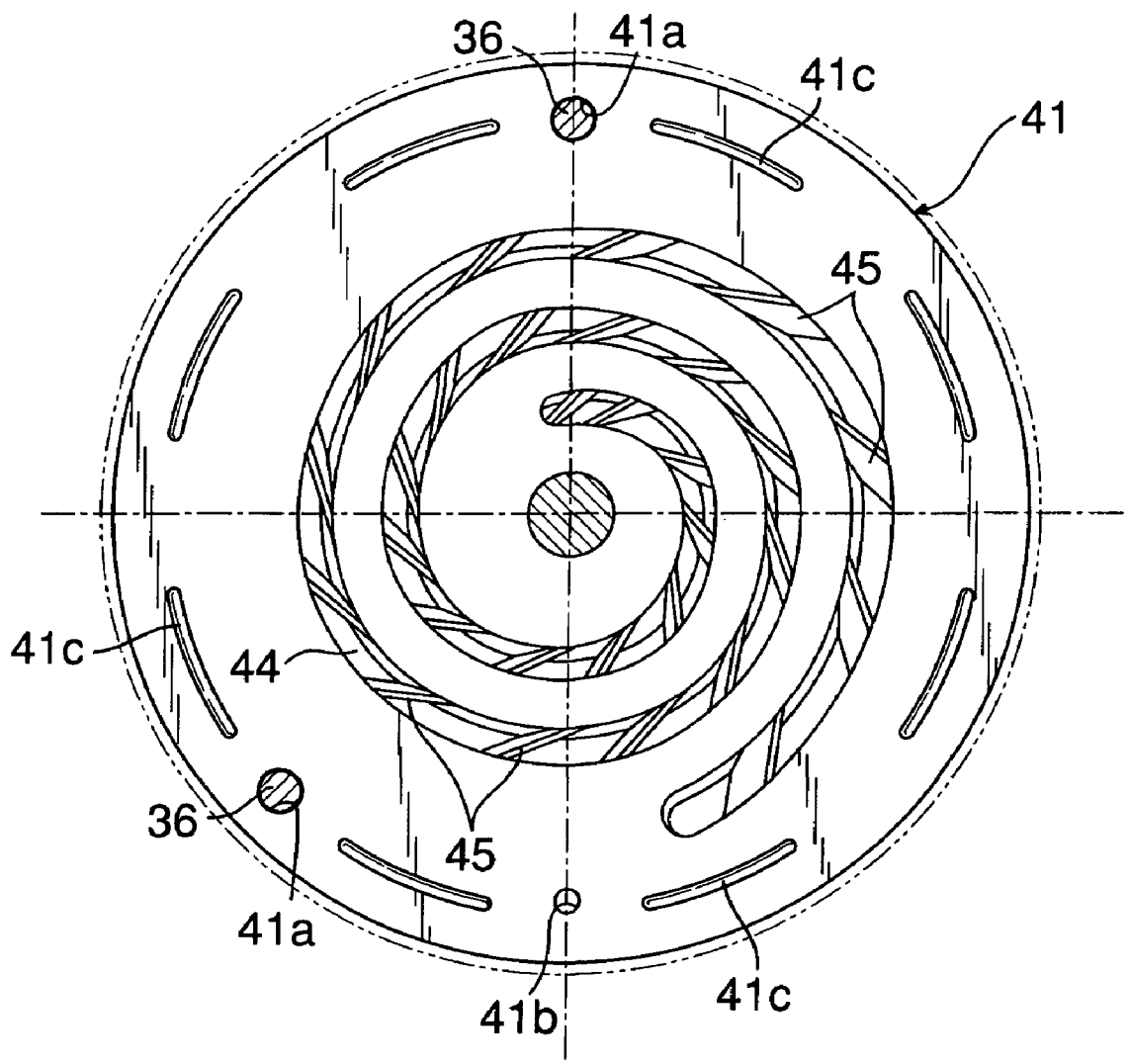
Figure 8:
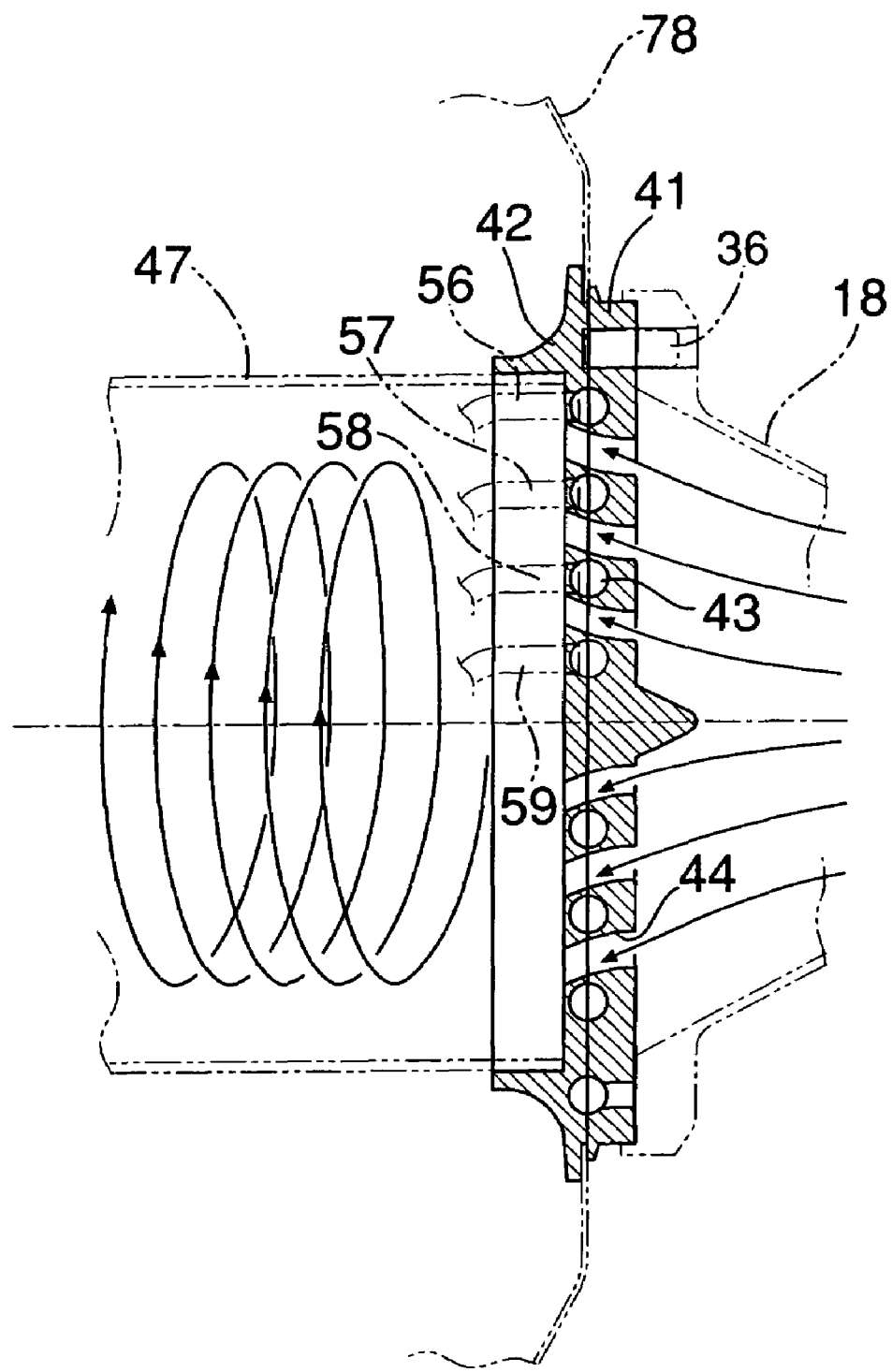
Figure 9:
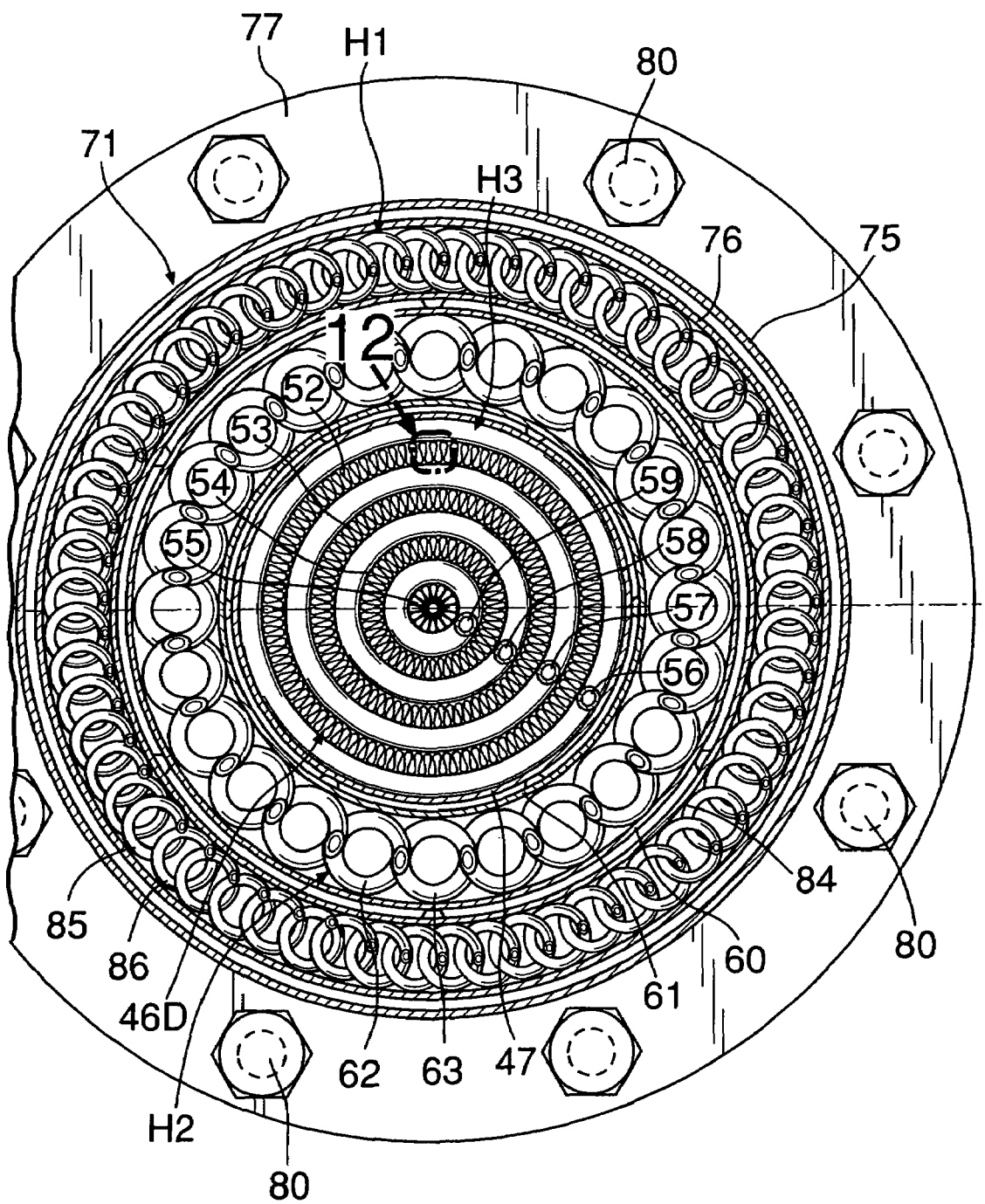
Figure 10:
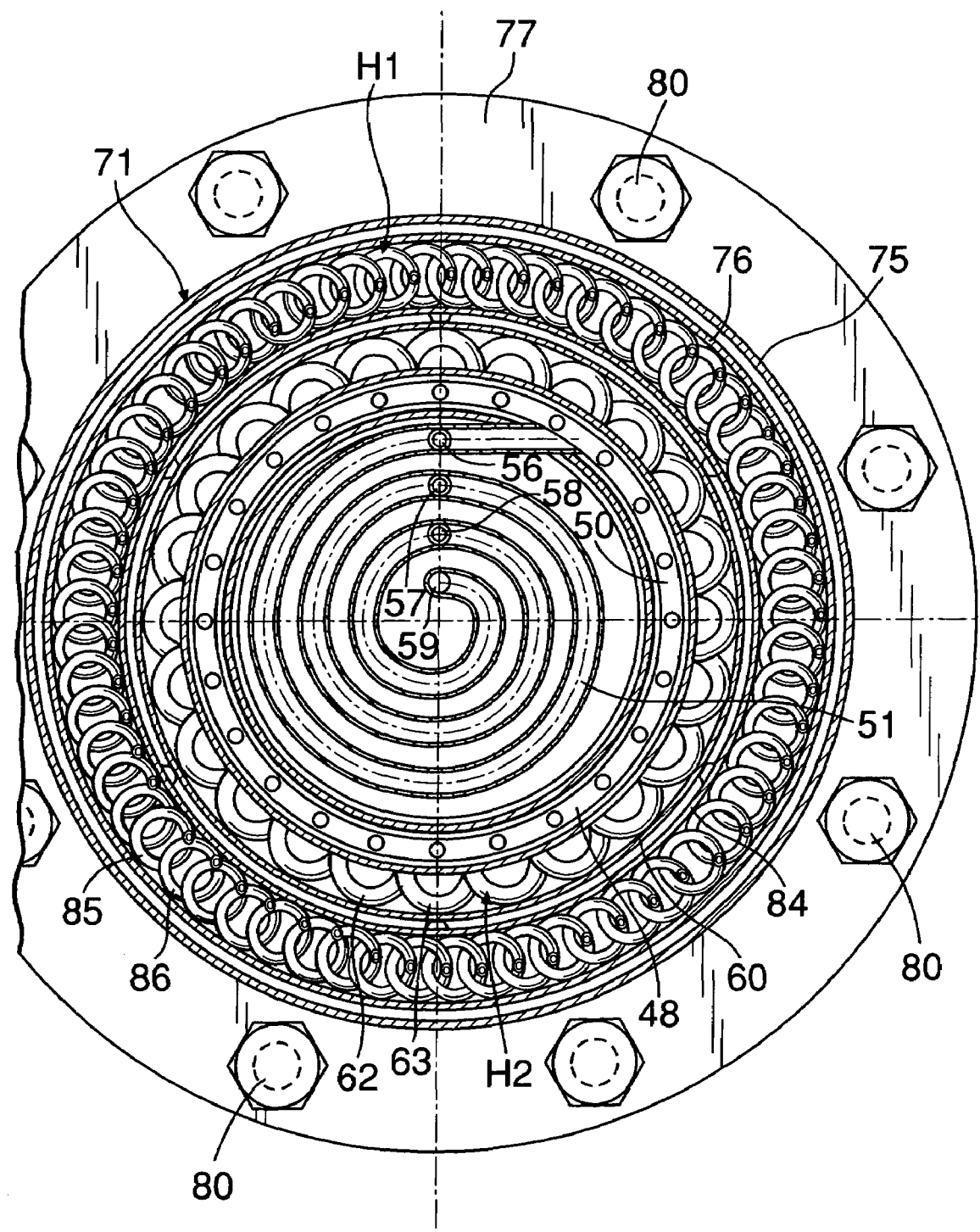
Figure 11:
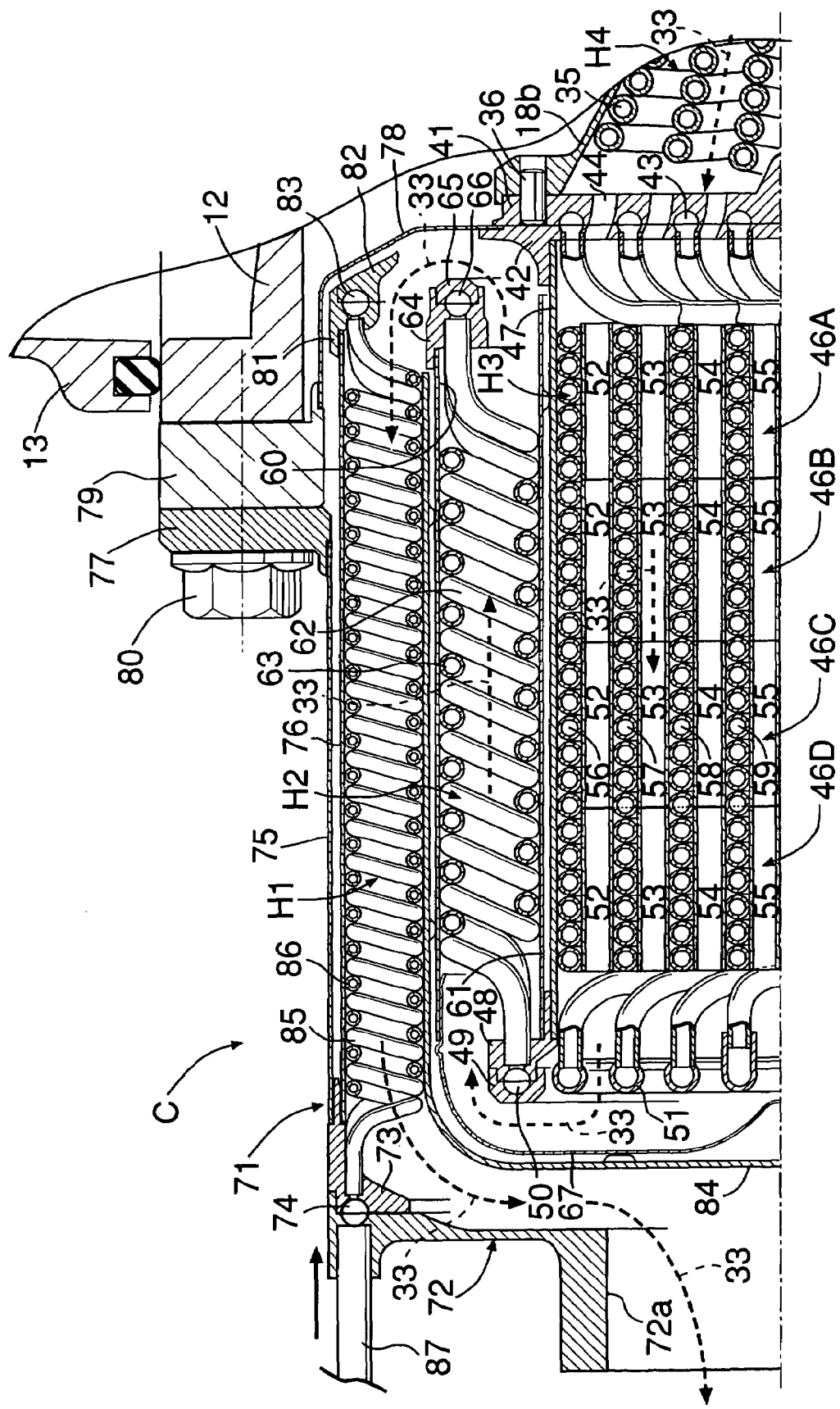
Figure 12:
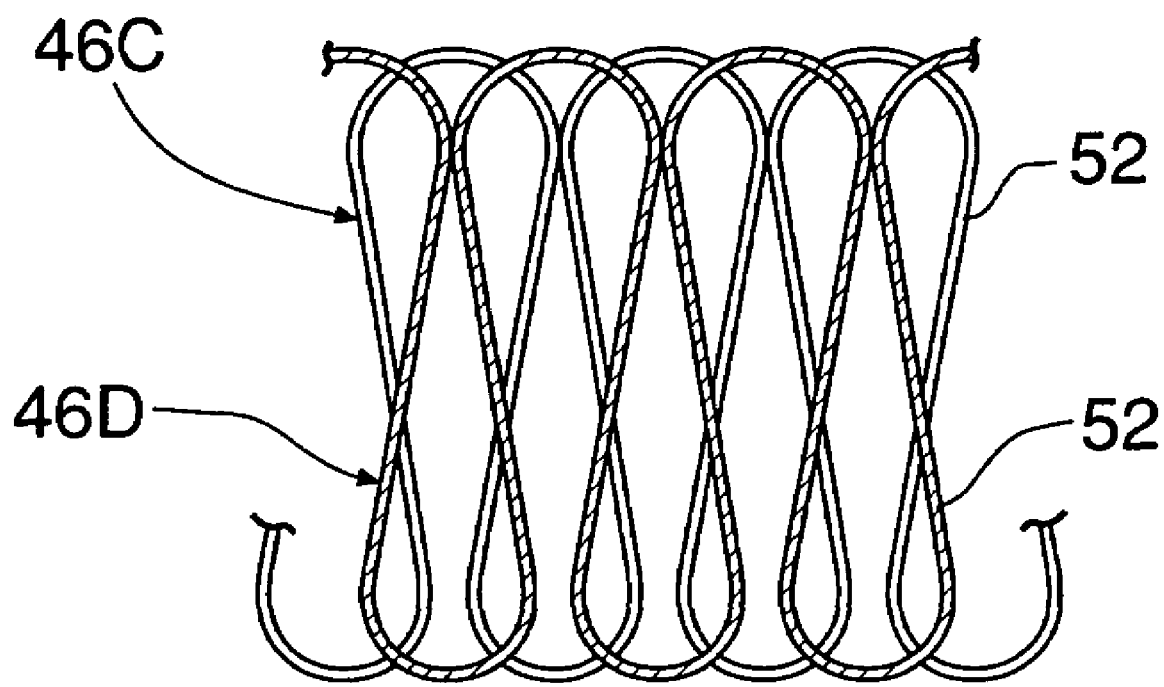

As shown in FIG. 1, an internal combustion engine E includes a cylinder block 11, a cylinder head 12, and a head cover 13, which are vertically stacked, and a piston 15 is slidably fitted in a cylinder bore 14 formed in the cylinder block 11. Among an intake port 17 and an exhaust port 18 individually communicating with a combustion chamber 16 formed in the cylinder head 12, the intake port 17 is bored within the cylinder head 12 as is conventional, but the exhaust port 18 is formed from a separate member and is joined to the cylinder head 12.

The upper end of a stem 21 of an intake valve 20 that opens and closes an intake valve hole 19 abuts against one end of an intake rocker arm 23 pivotably supported on an intake rocker arm shaft 22, and the upper end of a stem 26 of an exhaust valve 25 that opens and closes an exhaust valve hole 24 abuts against one end of an exhaust rocker arm 28 pivotably supported on an exhaust rocker arm shaft 27. The other end of the intake rocker arm 23 and the other end of the exhaust rocker arm 28 abut against an intake cam 30 and an exhaust cam 31 respectively provided on a camshaft 29 rotating in association with a crankshaft, which is not illustrated, thereby making the intake valve 20 and the exhaust valve 25 open and close.

Provided on a side face of the cylinder head 12 on the exhaust side is an integrated evaporator type exhaust gas purification system C. The structure of the integrated evaporator type exhaust gas purification system C is explained below by reference to FIGS. 2 to 15.

The evaporator generates steam having increased temperature and pressure using exhaust gas from the internal combustion engine E as a heat source, and includes an exhaust passage 33 having the exhaust port 18 as a base end and extending to an exhaust pipe 32 (see FIG. 1), and heat exchangers H1 to H5 disposed within the exhaust passage 33 and carrying out heat exchange with the exhaust gas. Metal catalyst devices 46A to 46D, which is will be described later, are incorporated into the third stage heat exchanger H3.

The exhaust port 18 is formed from a uniform diameter part 18a positioned on the upstream side of the flow of exhaust gas, and having a substantially constant diameter, and an increasing diameter part 18b provided so as to be connected to the downstream side of the uniform diameter part 18a and having a diameter that increases in a trumpet shape; the fifth stage heat exchanger H5 is provided around the outer periphery of the uniform diameter part 18a, and the fourth stage heat exchanger H4 is provided within the increasing diameter part 18b. The fifth stage heat exchanger H5 is formed from about 5 turns of a single heat transfer tube 34 wound around the outer periphery of the uniform diameter part 18a. The fourth stage heat exchanger H4 is formed from multiple windings of a single heat transfer tube 35 and is housed within the increasing diameter part 18b, and the heat transfer tube 34 of the fifth stage heat exchanger H5 runs through an opening (not illustrated) formed in the exhaust port 18 and is connected to the heat transfer tube 35 of the fourth stage heat exchanger H4.

Figure 13C:
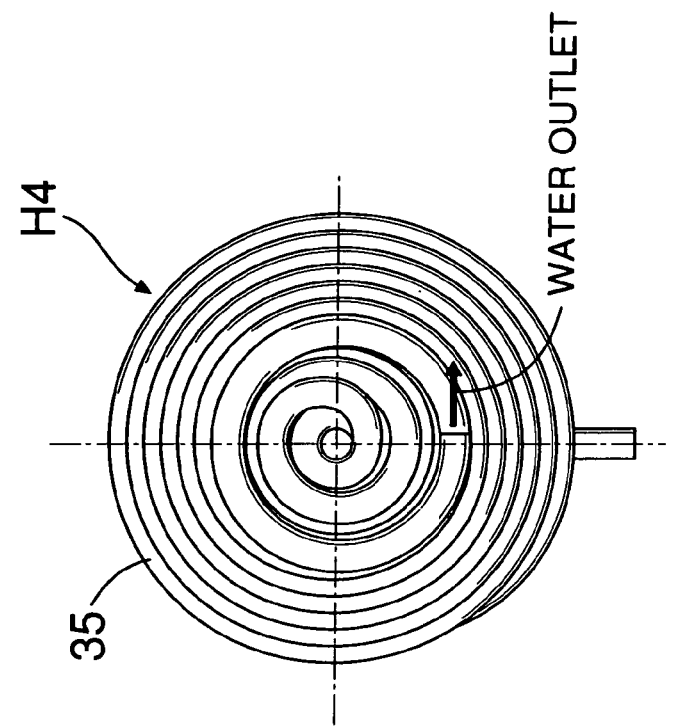
FIG. 13A to FIG. 13C are diagrams showing a heat transfer tube of a fourth stage heat exchanger.
Figure 13A:
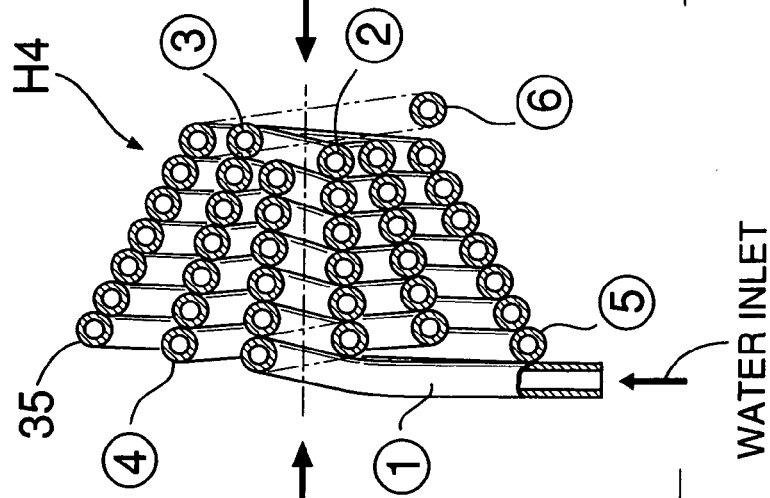
Figure 13B:
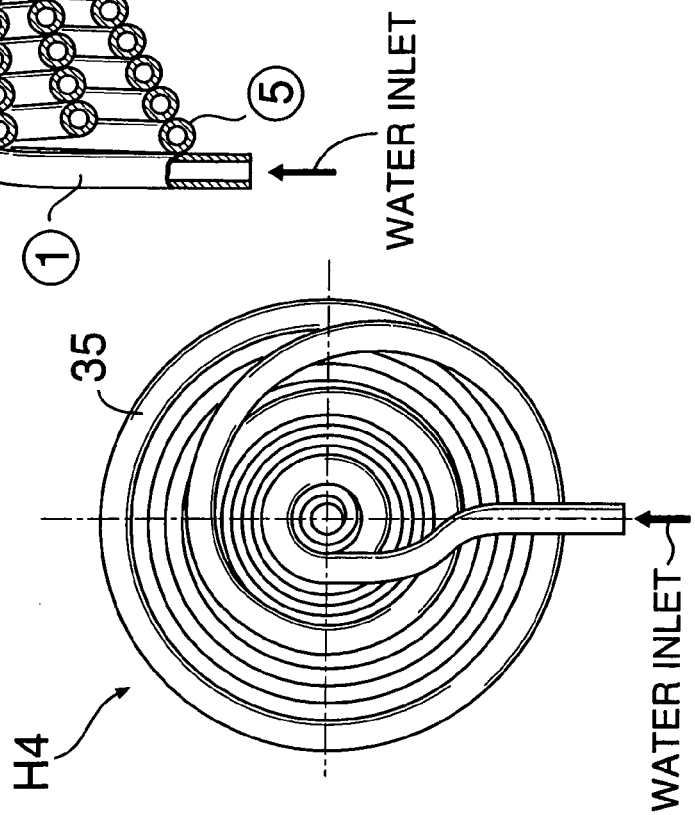

As is clear from reference to FIGS. 13A to 13C, the heat transfer tube 35 of the fourth stage heat exchanger H4 is wound into a triple coil shape that is tapered so as to conform to the shape of the interior of the increasing diameter part 18b of the exhaust port 18; the coil in the inner layer is wound from the rear (the left-hand side in the figure) toward the front (the right-hand side in the figure) while decreasing in diameter and is folded back at the front end; this is followed by the coil in the middle layer, which is wound from the front toward the rear while increasing in diameter and is folded back at the rear end; and this is followed by the coil in the outer layer, which is wound from the rear toward the front while decreasing in diameter. A water inlet shown in FIGS. 13A and 13B is connected to the third stage heat exchanger H3, which is on the upstream side and will be described later, and a water outlet shown in FIG. 13C is connected to the heat transfer tube 34 of the fifth stage heat exchanger H5, which is on the downstream side. The circled numerals $\hat{1}$ to $\hat{6}$ shown in FIG. 13A show the route via which water flows through the heat transfer tube 35.

Winding the heat transfer tube 35 of the fourth stage heat exchanger H4 into the triple coil shape that is tapered so as to conform to the shape of the interior of the increasing diameter part 18b of the exhaust port 18 makes it possible for there to be a rectifying effect on the exhaust gas that flows through the increasing diameter part 18b, thereby contributing to a reduction in the circulation resistance.

As is most clearly shown in FIGS. 3 to 8, a disk-shaped distribution passage forming member 41 is joined to the rear end of the increasing diameter part 18b of the exhaust port 18, and joining another disk-shaped distribution passage forming member 42 to the rear face of the distribution passage forming member 41 by brazing forms a second helical distribution passage 43 between the two distribution passage forming members 41, 42. The radially outer end of the second helical distribution passage 43 is connected to the upstream end of the heat transfer tube 35 of the fourth stage heat exchanger H4 by a method that will be described later. A helical opening 44 is formed in the two distribution passage forming members 41, 42 so as to follow the second helical distribution passage 43. The cross section of the helical opening 44 is inclined radially outward at the exit side so as to follow the inclination of the increasing diameter part 18b of the exhaust port 18, and a large number of guide vanes 45 are attached to the interior thereof in an inclined manner. The exhaust gas supplied from the increasing diameter part 18b of the exhaust port 18 therefore flows in a spiral while diffusing radially outward when passing through the helical opening 44.

A thick flange 18c is formed at the rear end of the increasing diameter part 18b of the exhaust port 18, and a circular step 18d extending rearward is formed at the radially outer end of the flange 18c. The outer periphery of the front face of the disc-shaped distribution passage forming member 14 is fitted into the step 18d of the exhaust port 18, and two pins 36, 36 are respectively fitted into two pin holes 18e, 18e formed in the flange 18c of the exhaust port 18 and two pin holes 41a, 41a formed in the distribution passage forming member 41. The distribution passage forming member 41, the exhaust port 18, and the two pins 36, 36 are joined by brazing. As shown enlarged in a circle in FIG. 3, the inner peripheral face of the step 18d of the flange 18c has a chamfer 18g such that, when the distribution passage forming member 41 is joined by brazing to the flange 18c of the exhaust port 18, the two can be fitted together easily and a brazing material flows reliably.

The downstream end (radially outer end) of the second helical distribution passage 43 formed between the two distribution passage forming members 41 and 42 is connected to the upstream end of the heat transfer tube 35 of the fourth stage heat exchanger H4 via the flange 18c of the exhaust port 18. That is, formed in the distribution passage forming member 41 is a passage 41b that is connected to the downstream end of the second helical distribution passage 43 and runs through the distribution passage forming member 41, and formed in the flange 18c of the exhaust port 18 is a passage 18f that communicates with the passage 41b. The passage 18f of the flange 18c is bent into an L-shaped form, and the upstream end of the heat transfer tube 35 of the fourth stage heat exchanger H4 is fitted into and joined to a portion of the passage 18f opening on the inner face of the exhaust port 18 (see FIG. 3).

In this way, the distribution passage forming member 41 and the exhaust port 18 are positioned in the circumferential direction by means of the pins 36, 36 and in the radial direction by means of the step 18d of the exhaust port 18, and joined by brazing. It is therefore possible to join the passage 41b of the distribution passage forming member 41 to the passage 18f of the exhaust port 18 without misalignment, and high-temperature, high-pressure steam can flow smoothly. Moreover, the steam is reliably prevented from leaking past the joining surfaces of the distribution passage forming member 41 and the exhaust port 18.

The distribution passage forming member 41 and the exhaust port 18 are brazed with a paste-form brazing material, and the brazing material is applied to the joining surfaces by means of an applicator (syringe). In this process, a plurality of brazing preplacement channels 41c (see FIG. 7) are formed on the distribution passage forming member 41, and the brazing material is applied to the channels 41c, thus further improving the strength and the sealing properties of the brazing. In this case, the brazing can be carried out more reliably by forming a gas vent hole having a small diameter (for example, on the order of 1.0 mm) so as to make the brazing preplacement channels 41c communicate with the outside and by releasing the gas generated when the brazing material melts. Moreover, if a check hole communicating with the joining surfaces is provided, it can be checked through the check hole that the brazing has been carried out reliably, thereby improving the reliability of the brazing. If there are no structural restrictions, the brazing preplacement channels 41c are desirably positioned in rotationally symmetrical positions. The brazing material used in the embodiment is the Ni-based Base 905 X, which is manufactured by Tokyo Braze Co., Ltd. The brazing temperature therefor is 1000° C. to 1100° C., and consideration is given to preventing the brazing material from being melted by the heat of the exhaust gas.

As is most clearly shown in FIGS. 2, 9 to 11, and 14, the front end of a cylindrical case 47 covering the outer peripheries of the first stage metal catalyst device 46A to the fourth stage metal catalyst device 46D and the third stage heat exchanger H3 is joined to the distribution passage forming member 42, a fourth circular distribution passage 50 is formed between two annular distribution passage forming members 48, 49, which are superimposed on one another and joined to the rear end of the cylindrical case 47, and the fourth circular distribution passage 50 is connected to the outer end of a first helical distribution passage 51 formed by bending a pipe into a helical shape. The first stage metal catalyst device 46A to the fourth stage metal catalyst device 46D, which are disposed in line, are each made by forming concentrically disposed annular corrugated metal supports 52 to 55 having four different diameters and supporting an exhaust gas purification catalyst on the surface thereof. As shown enlarged in FIG. 12, the phases of the corrugations of the metal supports 52 to 55 of each stage of the metal catalyst devices 46A to 46D are displaced by half a pitch from each other.

Figure 14:
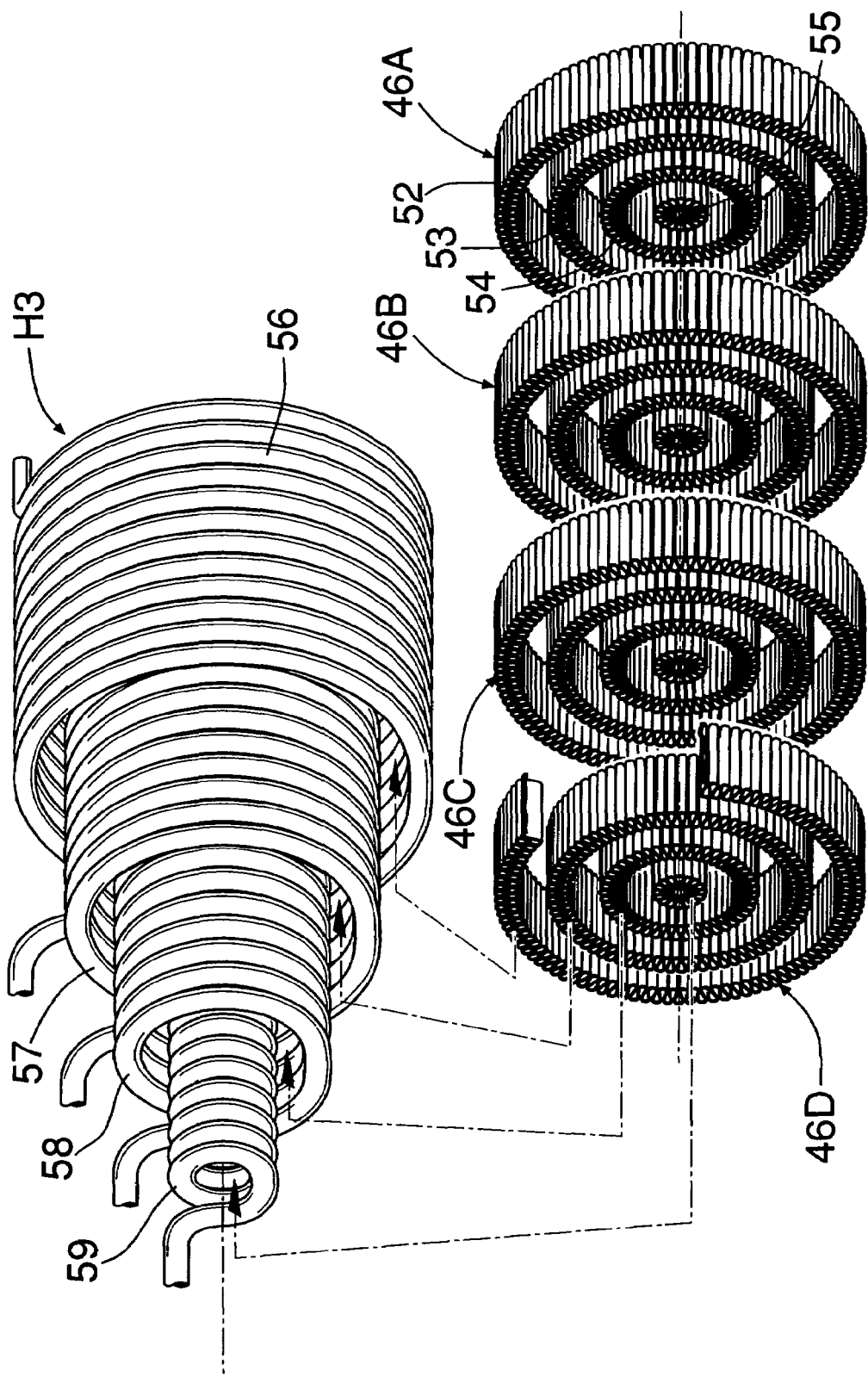

The third stage heat exchanger H3 is formed from four heat transfer tubes 56 to 59 that have different diameters and are wound into a coiled shape (see FIG. 14). The four heat transfer tubes 56 to 59 are housed within the cylindrical case 47 so that they are concentric with and disposed alternately with the four metal supports 52 to 55 of the first stage metal catalyst device 46A to the fourth stage metal catalyst device 46D. The downstream ends of the four heat transfer tubes 56 to 59 are connected to a middle part of the second helical distribution passage 43, and the upstream ends of the four heat transfer tubes 56 to 59 are connected to a middle part of the first helical distribution passage 51.

Two cylindrical cases 60, 61 are coaxially disposed radially outside the cylindrical case 47 covering the outer peripheries of the first stage metal catalyst device 46A to the fourth stage metal catalyst device 46D and the third stage heat exchanger H3, and the second stage heat exchanger H2 is disposed in an annular form between the two cylindrical cases 60, 61. The second stage heat exchanger H2 is formed from a large number of heat transfer tubes 62 wound into a coiled shape in one direction and a large number of heat transfer tubes 63 wound in a coiled shape in the other direction, the tubes 62, 63 being disposed alternately so that parts thereof are meshed together, thereby increasing the packing density of the heat transfer tubes 62, 63 within the space. The outer peripheries of the first stage metal catalyst device 46A to the fourth stage metal catalyst device 46D and the third stage heat exchanger H3 are thus surrounded by the heat transfer tubes 62, 63 of the second stage heat exchanger H2.

A third circular distribution passage 66 is formed between an annular distribution passage forming member 64 fixed to the front end of the outer cylindrical case 60 and an annular distribution passage forming member 65 joined to the front face of the distribution passage forming member 64. The upstream ends of the heat transfer tubes 62, 63 of the second stage heat exchanger H2 are connected to the third circular distribution passage 66, and the downstream ends of the heat transfer tubes 62, 63 are connected to the fourth circular distribution passage 50. Fixed to the rear end of the cylindrical case 60 covering the outside of the second stage heat exchanger H2 is a dish-shaped end cap 67 covering the rear faces of the first stage metal catalyst device 46A to the fourth stage metal catalyst device 46D and the third stage heat exchanger H3.

A detachable cover 71 forming an outer casing of the integrated evaporator type exhaust gas purification system C includes a plate-shaped distribution passage forming member 72 having an exhaust hole 72a connected to the exhaust pipe 32 in its center and an annular distribution passage forming member 73 joined to the front face of the distribution passage forming member 72, and a first circular distribution passage 74 is formed between the two distribution passage forming members 72, 73. A cylindrical case 75 positioned radially outside and a cylindrical case 76 positioned radially inside extend forward, with a slight gap therebetween, from the distribution passage forming member 73, and a flange 77 provided on the front end of the outer cylindrical case 75 is superimposed on a flange 79 provided on the rear end of a mounting plate 78 fixed to the distribution passage forming member 42 and they are secured to the cylinder head 12 by bolts 80.

An annular distribution passage forming member 81 is fixed to the front end of the inner cylindrical case 76, and a second circular distribution passage 83 is formed by joining an annular distribution passage forming member 82 to the front face of the distribution passage forming member 81. The first circular distribution passage 74 and the second circular distribution passage 83 have identical shapes and face each other in the front to rear direction. A cup-shaped inner wall member 84 is housed within the cover 71, and the first stage heat exchanger H1 is disposed between the outer periphery of the inner wall member 84 and the inner periphery of the inner cylindrical case 76.

The first stage heat exchanger H1 has a similar structure to that of the second stage heat exchanger H2; a large number of heat transfer tubes 85 wound into a coiled shape in one direction and a large number of heat transfer tubes 86 wound into a coiled shape in the other direction are disposed alternately so that parts thereof are meshed together, and these heat transfer tubes 85, 86 surround the outer periphery of the second stage heat exchanger H2. The upstream ends of the heat transfer tubes 85, 86 are connected to the is first circular distribution passage 74, and the downstream ends thereof are connected to the second circular distribution passage 83.

The materials for the heat transfer tube 34 of the fifth stage heat exchanger H5, the heat transfer tube 35 of the fourth stage heat exchanger H4, the heat transfer tubes 56 to 59 of the third stage heat exchanger H3, the heat transfer tubes 62, 63 of the second stage heat exchanger H2, and the heat transfer tubes 85, 86 of the first stage heat exchanger H1 are preferably heat-resistant stainless steel (austenite type such as SUS 316L or SUS 310S, ferrite type such as SUS 430 or SUS 444) or a nickel-based heat-resistant alloy. Joining of the heat transfer tubes is preferably carried out by brazing, laser welding, or mechanical restraint.

Furthermore, with regard to the metal supports 52 to 55 of the first stage metal catalyst device 46A to the fourth stage metal catalyst device 46D, heat-resistant stainless steel (e.g., 20 wt % Cr—5 wt % Al ferrite type stainless steel) or a nickel-based heat-resistant alloy metal foil (thickness 0.1 mm or below) is preferable.

Figure 15:
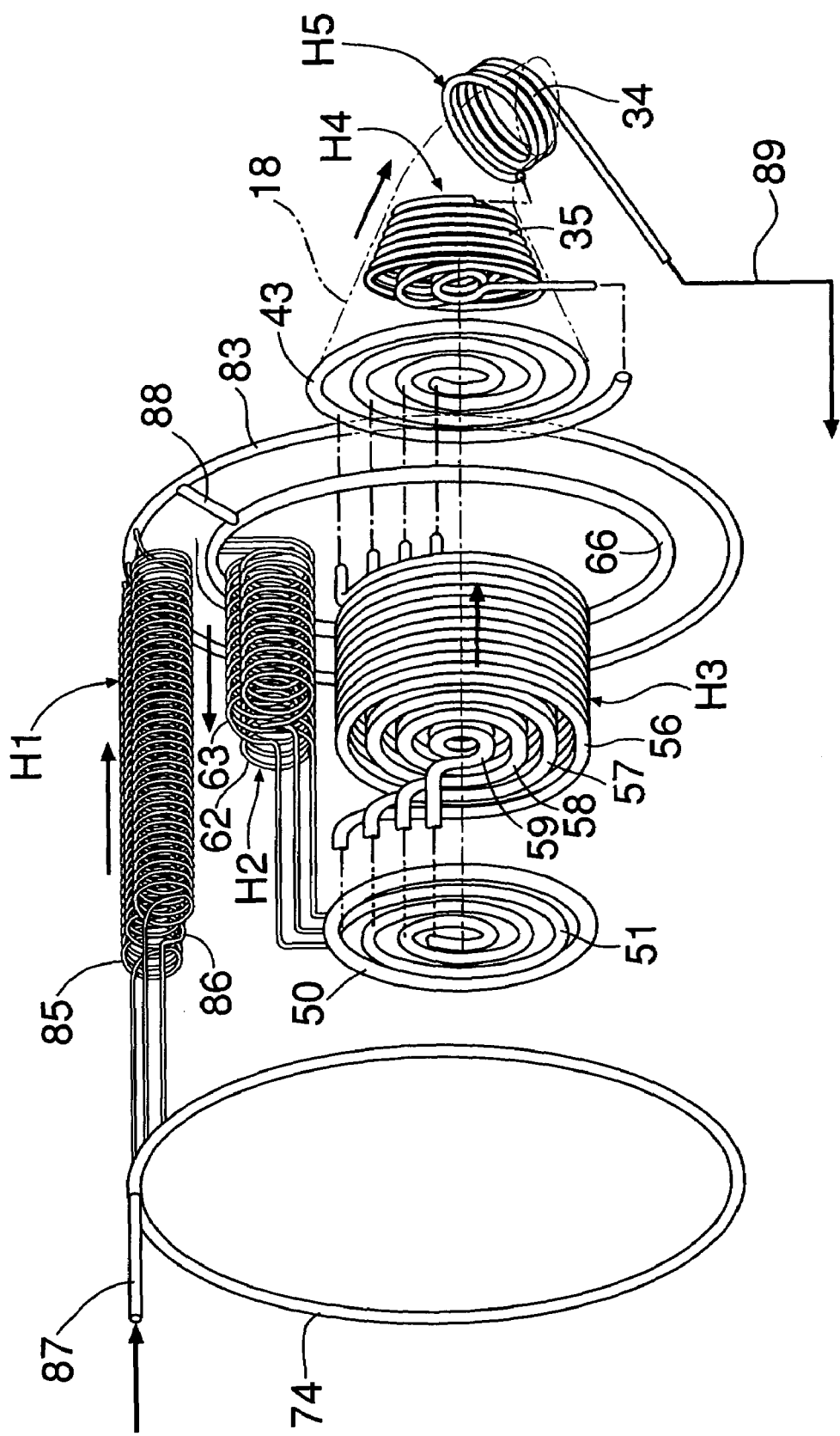

As is clear from reference to FIG. 15 a water inlet 87, into which water that is a source of high pressure steam is supplied, is provided in the first circular distribution passage 74, which communicates with the second circular distribution passage 83 via a large number of the heat transfer tubes 85, 86 of the first stage heat exchanger H1, and the second circular distribution passage 83 communicates with the third circular distribution passage 66 via a communicating passage 88. The third circular distribution passage 66 communicates with the fourth circular distribution passage 50 via the heat transfer tubes 62, 63 of the second stage heat exchanger H2, and the fourth circular distribution passage 50 communicates with the four heat transfer tubes 56 to 59 of the third stage heat exchanger H3 via the first helical distribution passage 51. The four heat transfer tubes 56 to 59 of the third stage heat exchanger H3 communicate with a steam outlet 89 via the second helical distribution passage 43, the heat transfer tube 35 of the fourth stage heat exchanger H4, and the heat transfer tube 34 of the fifth stage heat exchanger H5.

In this way, while the water that is supplied from the water inlet 87 travels to the steam outlet 89 via the first stage heat exchanger H1→the second stage heat exchanger H2→the third stage heat exchanger H3→the fourth stage heat exchanger H4→the fifth stage heat exchanger H5, it exchanges heat with the exhaust gas that is discharged from the internal combustion engine E and flows in a direction opposite to the direction of flow of the water, and becomes steam.

That is, while passing through the uniform diameter part 18a of the exhaust port 18 the exhaust gas coming out of the internal combustion engine E exchanges heat with the fifth stage heat exchanger H5 formed from the heat transfer tube 34 wound around the outer periphery of the uniform diameter part 18a. The exhaust gas that has flowed from the uniform diameter part 18a of the exhaust port 18 into the increasing diameter part 18b exchanges heat by direct contact with the fourth stage heat exchanger H4 formed from the heat transfer tube 35 wound into a triple coil shape and housed within the increasing diameter part 18b. Harmful components are removed from the exhaust gas coming out of the exhaust port 18 while it passes through the interiors of the first stage metal catalyst device 46A to the fourth stage metal catalyst device 46D and, at this point, the exhaust gas exchanges heat with the third stage heat exchanger H3 formed from the heat transfer tubes 56 to 59 arranged concentrically with the first stage to fourth stage metal catalyst devices 46A to 46D.

The exhaust gas that has passed through the first stage to fourth stage metal catalyst devices 46A to 46D and the third stage heat exchanger H3 is blocked by the end cap 67 and makes a U-turn, exchanges heat while flowing from the rear to the front through the second stage heat exchanger H2 formed from the heat transfer tubes 62, 63 disposed between the pair of cylindrical cases 60, 61, then changes direction through 180°, exchanges heat while flowing from the front to the rear through the first stage heat exchanger H1 formed from the heat transfer tubes 85, 86 disposed between the cylindrical case 76 and the inner wall member 84, and is finally discharged into the exhaust pipe 32 through the exhaust hole 72a of the distribution passage forming member 72.

The exhaust gas that has passed through the fourth stage heat exchanger H4 diffuses radially outward when passing through the helical opening 44 that communicates with the increasing diameter part 18b of the exhaust port 18, and is given a spiral flow by the guide vanes 45 attached to the interior of the helical opening 44. This makes the exhaust gas act uniformly over all of the first stage to fourth stage metal catalyst devices 46A to 46D and increases the residence time of the exhaust gas within the first stage to fourth stage metal catalyst devices 46A to 46D, thereby enhancing the exhaust gas purification effect. As shown enlarged in FIG. 12, since the phases of the corrugations of the metal supports 52 to 55 of each stage of the metal catalyst devices 46A to 46D are displaced by half a pitch from each other, a strong turbulent flow can be caused in the exhaust gas flow. This increases the residence time of the exhaust gas within the first stage to fourth stage metal catalyst devices 46A to 46D, thereby enhancing the exhaust gas purification effect and the heat exchange efficiency of the adjoining third stage heat exchanger.

Furthermore, the flow path lengths of the four heat transfer tubes 56 to 59, which include the flow path lengths of parts of the first and second helical distribution passages 51 and 43, can be made as uniform as possible by connecting the four heat transfer tubes 56 to 59 of the third stage heat exchanger H3 to optimal positions on the first helical distribution passage 51 and the second helical distribution passage 43; that is, connecting opposite ends of the heat transfer tube 56, which is radially outside and has a long tube length, to the radially outer side of the first helical distribution passage 51 and the radially outer side of the second helical distribution passage 43; and connecting opposite ends of the heat transfer tube 59, which is radially inside and has a short tube length, to the radially inner side of the first helical distribution passage 51 and the radially inner side of the second helical distribution passage 43, thereby reducing differences in pressure loss between the heat transfer tubes 56 to 59.

Moreover, since the first stage to fourth stage metal catalyst devices 46A to 46D and the third stage heat exchanger H3 are integrated so as to exchange heat with each other, the heat of reaction generated in the first stage to fourth stage metal catalyst devices 46A to 46D can be recovered by the third stage heat exchanger H3, thereby enhancing the thermal energy recovery effect and, furthermore, by controlling the flow rate of water flowing through the third stage heat exchanger H3 the first stage to fourth stage metal catalyst devices 46A to 46D can be heated and activated, or the first stage to fourth stage metal catalyst devices 46A to 46D can be cooled, thereby improving the durability.

The exhaust gas that has passed through the first stage to fourth stage metal catalyst devices 46A to 46D and the third stage heat exchanger H3 also exchanges heat when passing through the first helical distribution passage 51, which is formed from a helical pipe material. Since this first helical distribution passage 51 diffuses the flow of the exhaust gas, heat spots can be prevented from occurring in the end cap 67, which is present to the rear of the passage 51 at the position where the exhaust gas turns back; the end cap 67, which is under thermally severe conditions, can be protected, and radiation of heat from the end cap 67 can be prevented. Moreover, since the first helical distribution passage 51, which is formed from the helical pipe material, is flexible, differences in thermal expansion between the four heat transfer tubes 56 to 59, which have different overall lengths, can be absorbed.

Furthermore, since the exhaust gas flows from the internal combustion engine E side to the exhaust pipe 32 side whereas the water flows from the exhaust pipe 32 side to the internal combustion engine E side, the exhaust gas and the water are in a cross-flow state, thus maintaining a maximum temperature difference between the exhaust gas and the water through the entire region of the first stage to fifth stage heat exchangers H1 to H5 and thereby contributing to an improvement in the heat exchange efficiency therebetween. Moreover, since the exhaust passage 33 is bent into a three stage zigzag shape and the first stage to third stage heat exchangers H1 to H3 are disposed in layers in the radial direction, the overall dimensions of the integrated evaporator type exhaust gas purification system C can be reduced as much as possible while minimizing thermal leakage and preventing noise from being dissipated from the interior thereof, thereby providing a compact layout thereof in the cylinder head 12 of the internal combustion engine E.

Moreover, since the first stage to third stage heat exchangers H1 to H3 and the first stage to fourth stage metal catalyst devices 46A to 46D are arranged in a labyrinth-shaped form by disposing them in layers in the radial direction, not only can their silencing effect be effective in preventing exhaust noise from leaking outside the integrated evaporator type exhaust gas purification system C, but also an exhaust gas temperature lowering effect can be given, mainly by the first stage to fifth stage heat exchangers H1 to H5. This allows an exhaust muffler to be simplified or omitted, thereby making the exhaust system itself compact and lightweight. Furthermore, since the decrease in exhaust gas temperature causes the temperature of the exhaust passage to decrease, particularly on the downstream side of the first stage heat exchanger H1, the degrees of freedom in design with regard to heat resistance increase, and the use of a material such as a plastic for the exhaust passage becomes possible. As a result, with regard to the internal combustion engine E for a vehicle, the degrees of freedom in the shape of the exhaust passage, the degrees of freedom in mounting on the vehicle, the degrees of freedom in terms of cooling characteristics, etc. increase, thereby increasing the degrees of freedom in the design of the entire vehicle, which has been subjected to restrictions by conventional exhaust systems, and contributing to a reduction in the overall weight of the exhaust system.

Figure 16:
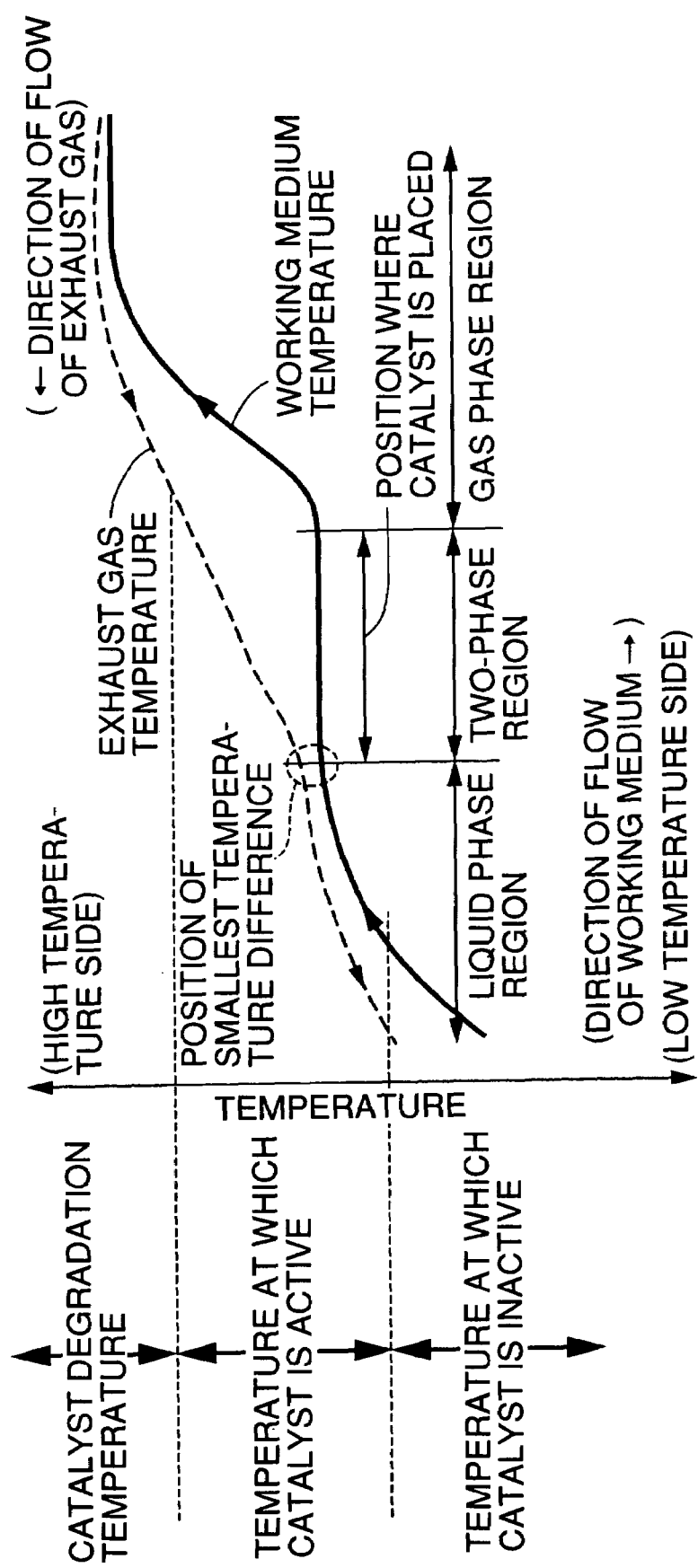

The positions where the first stage to fourth stage metal catalyst devices 46A to 46D are placed are now explained by reference to FIG. 16.

The exhaust gas temperature gradually decreases from its upstream side to its downstream side, and the temperature of the water or steam (working medium), which flows in the opposite direction to the exhaust gas, gradually increases from its upstream side to its downstream side, but since the exhaust gas temperature can always be held higher than the temperature of the working medium, heat is transferred from the exhaust gas to the working medium. The working medium is originally in a state in which there is only water (liquid phase region), moves into a state in which water and steam are present as a mixture (two-phase region) when the working medium is heated by the heat of the exhaust gas, and moves into a state in which there is only steam (gas phase region) when the working medium is further heated by the heat of the exhaust gas. In the two-phase region, the temperature of the mixture of water and steam is held at a fixed value.

A temperature region in which the catalyst is inactive, where the catalyst of the first stage to fourth stage metal catalyst devices 46A to 46D cannot exhibit its function sufficiently because of low temperature, corresponds to a part of the upstream side in the liquid phase region. Conversely, a catalyst degradation temperature region, where the catalyst is degraded because of high temperature, corresponds to a part of the downstream side in the gas phase region. Therefore, by placing the first stage to fourth stage metal catalyst devices 46A to 46D in a temperature region in which the catalyst is active, between the temperature region in which the catalyst is inactive and the catalyst degradation temperature region, that is, any of a downstream area in the liquid phase region, the whole area of the two-phase region, and an upstream area in the gas phase region, the exhaust gas purification performance can be exhibited while preventing deterioration of the catalyst.

In general, the temperature region in which the catalyst is active in an internal combustion engine that is used in a mobile machine such as an automobile and involves variation of output has an upper limit value of 800° C. to 900° C. and a lower limit value of 250° C. to 300° C. Furthermore, the temperature region in which the catalyst is active in an internal combustion engine that is used in a stationary plant machine such as an electric generator and has a constant output has an upper limit value of 500° C. to 600° C. and a lower limit value of 100° C. to 200° C.

In the embodiment, the liquid phase region corresponds to the first stage heat exchanger H1 and the second stage heat exchanger H2, the two-phase region corresponds to the third stage heat exchanger H3, and the gas phase region corresponds to the fourth stage heat exchanger H4 and the fifth stage heat exchanger H5. The temperature difference between the exhaust gas temperature and the working medium temperature is the smallest at the interface between the liquid phase region and the two-phase region (that is, the interface between the second stage heat exchanger H2 and the third stage heat exchanger H3), and the first stage to fourth stage metal catalyst devices 46A to 46D are incorporated into the third stage heat exchanger H3, which is in the vicinity of the position where the temperature difference is the smallest and on the upstream side of the flow of the exhaust gas.

Since the amount of heat transferred from the exhaust gas to the working medium is proportional to the temperature difference therebetween, heat transfer from the exhaust gas to the working medium cannot be carried out effectively in a part where the temperature difference is small. However, since the exhaust gas purification reaction by the catalyst of the first stage to fourth stage metal catalyst devices 46A to 46D is exothermic, by placing the first stage to fourth stage metal catalyst devices 46A to 46D in the vicinity of the position where the temperature difference is the smallest, that is, in the interior of the third stage heat exchanger H3, the working medium can be heated effectively by means of the heat generated by the catalyst, thus improving the efficiency of the third stage heat exchanger H3. In particular, since the first stage to fourth stage metal catalyst devices 46A to 46D are placed on the upstream side of the flow of exhaust gas relative to the position where the temperature difference is the smallest, the heat of reaction generated by the catalysts can be applied effectively to the position where the temperature difference is the smallest, which is immediately downstream of the first stage to fourth stage metal catalyst devices 46A to 46D, thus heating the working medium effectively. Moreover, since the first stage to fourth stage metal catalyst devices 46A to 46D are disposed in the two-phase region of the working medium where the temperature is constant, and this constant temperature is a temperature at which the catalyst is active, the catalyst can exhibit a stable exhaust gas purification performance.

In the embodiment above, the first stage to fourth stage metal catalyst devices 46A to 46D are disposed within the third stage heat exchanger H3, which corresponds to the two-phase region of the working medium, but they may be disposed in a position corresponding to the liquid phase region (for example, within the second stage heat exchanger H2) as long as the position is in the vicinity of the position where the temperature difference is the smallest. In the embodiment above, the position where the temperature difference is the smallest is at the interface between the second stage heat exchanger H2 and the third stage heat exchanger H3, but if the position where the temperature difference is the smallest is displaced toward the interior of the second stage heat exchanger H2, the above case is also possible.

Figure 18:
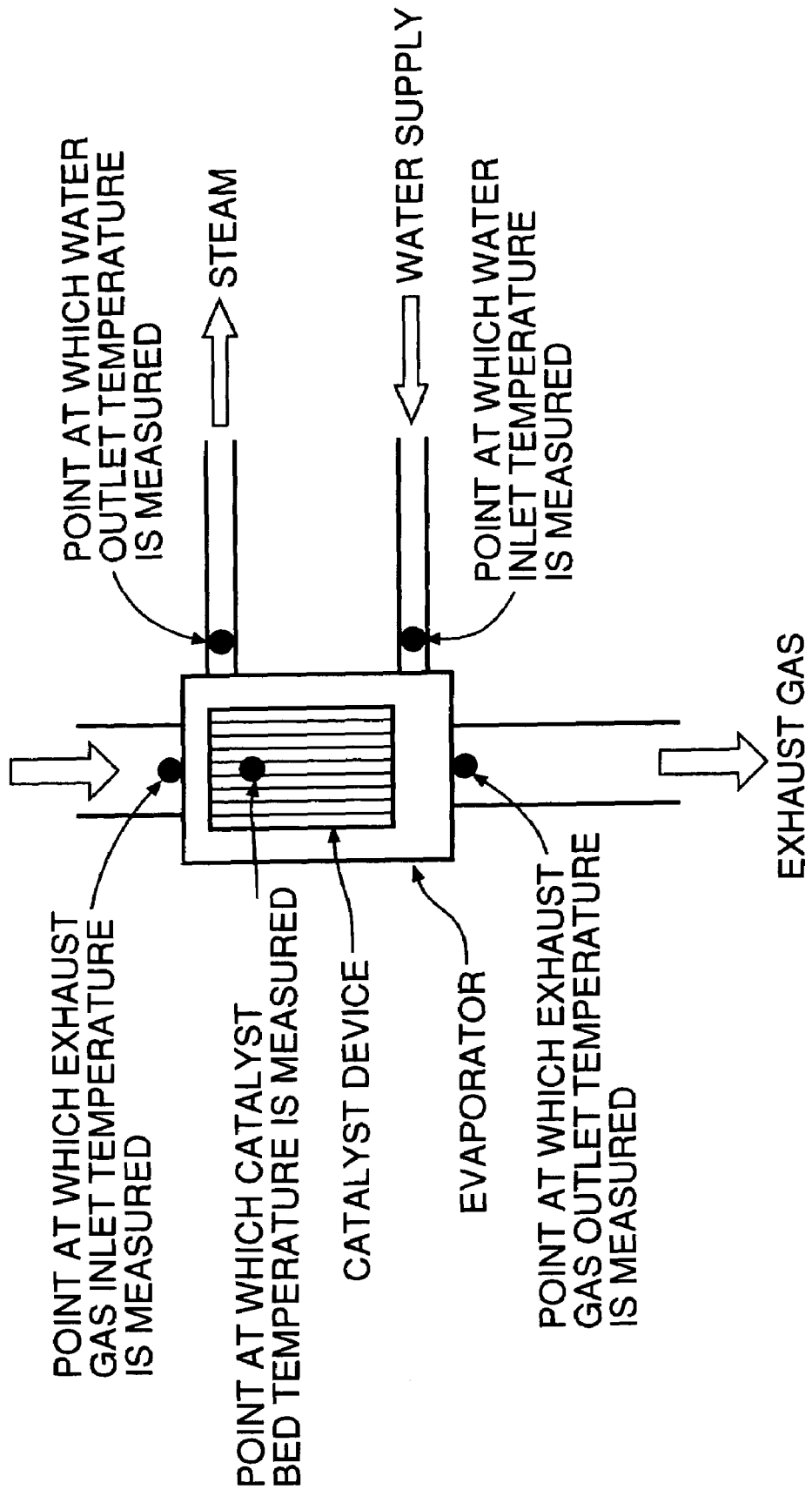
Figure 19:
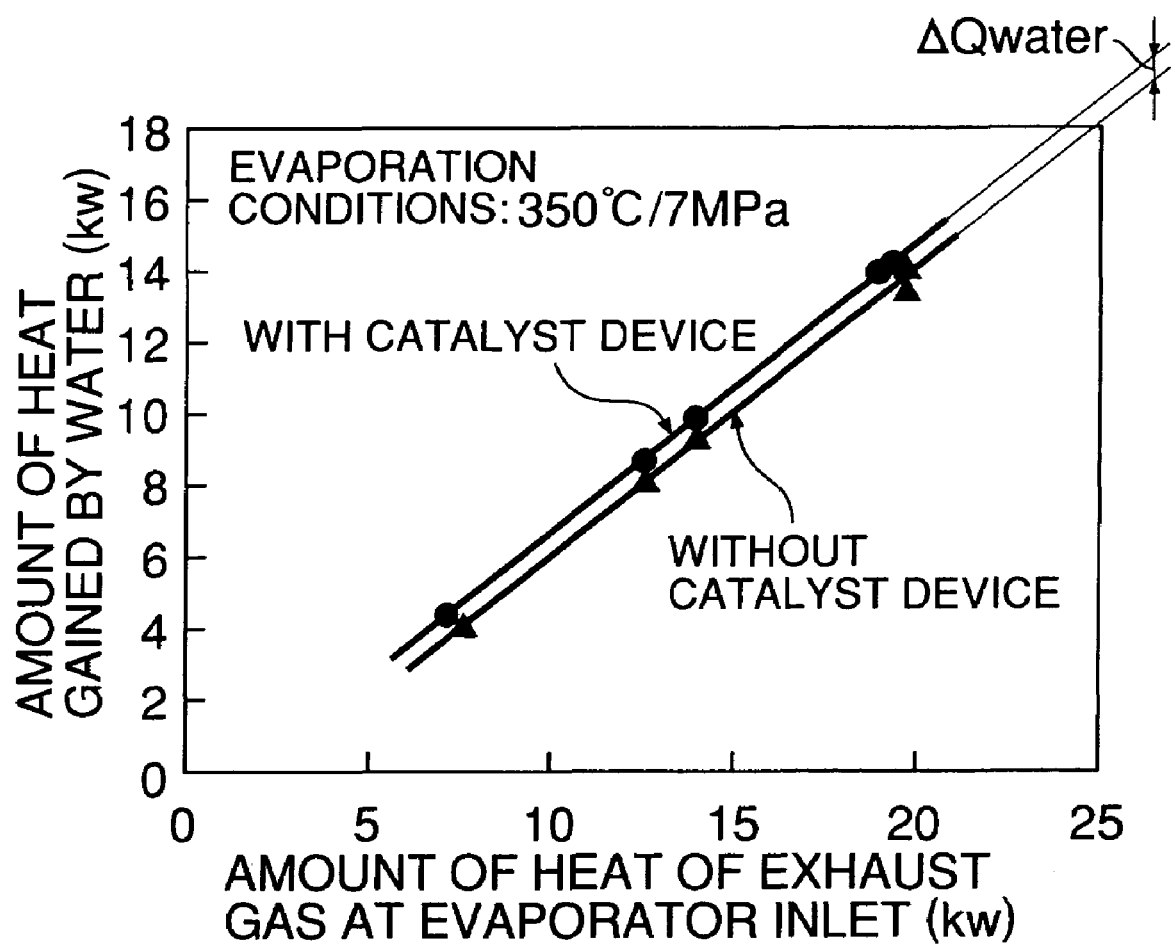
Figure 20:
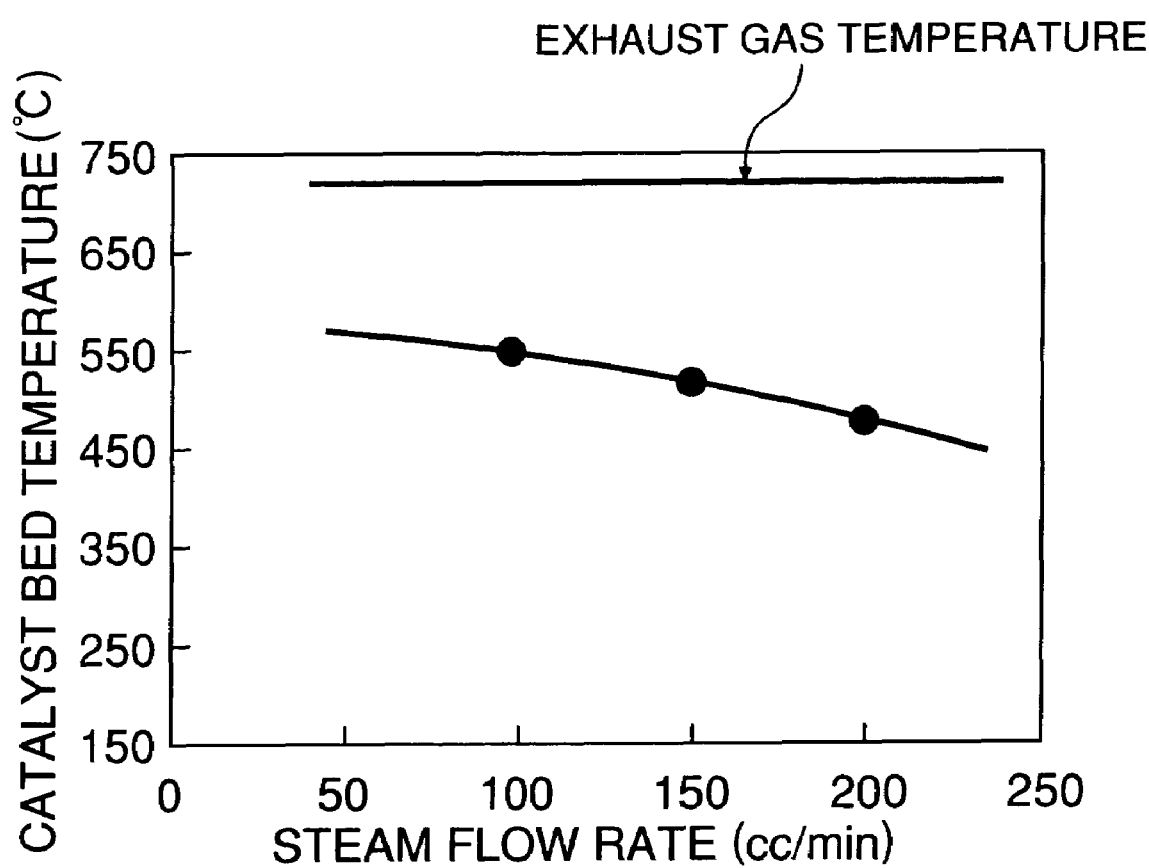

FIG. 19 shows the change in the amount of heat gained by the working medium (that is, water) depending on whether the catalyst device is present or absent, and FIG. 20 shows the change in the catalyst bed temperature in response to the amount of water supplied (that is, the steam flow rate). FIG. 18 shows positions where the temperatures are measured in order to obtain the above data. That is, the exhaust gas inlet temperature is measured at the exhaust gas inlet of the evaporator, the exhaust gas outlet temperature is measured at the exhaust gas outlet of the evaporator, the water inlet temperature is measured at the water inlet of the evaporator, the water outlet temperature is measured at the water outlet of the evaporator, and the catalyst is bed temperature is measured in the vicinity of the exhaust gas inlet of the catalyst device.

As is clear from FIG. 19, when the evaporator steam generation conditions are set at 350° C./7 MPa, and the amount of heat of the exhaust gas at the inlet of the evaporator is changed, the amount of heat gained by the water in the evaporator having the catalyst device is larger than that gained by the evaporator without the catalyst device by a substantially constant amount of heat ΔQwater regardless of the amount of heat of the exhaust gas. This is because, in addition to the amount of heat of the exhaust gas, the amount of heat generated by the catalyst device contributes to an increase in the water temperature. The amount of heat of the exhaust gas at the evaporator inlet can be obtained from the exhaust gas inlet temperature and the exhaust gas flow rate, and the amount of heat gained by the water can be obtained from the water inlet temperature, the water outlet temperature, and the water flow rate.

As is clear from FIG. 20, when the steam flow rate is changed in a state in which the exhaust gas inlet temperature is set at 720° C., the catalyst bed temperature decreases in response to an increase in the steam flow rate. This is because the larger the flow rate, the more easily the steam can carry away the heat generated by the catalyst device, and it indicates that the catalyst bed temperature can be maintained at less than the catalyst degradation temperature by means of the steam flow rate.

TABLE 1

|  |  | High temperature heat resistance (degradation of catalyst) | (overheating of heat transfer tube) | Overall evaluation |
|---|---|---|---|---|
| Embodiment | 1 placed in two-phase region | Good | Excellent | Excellent to good |
|  | 2 placed in liquid phase region | Excellent | Good | Excellent to good |
| Comparative Example | 1 no catalyst | — | Average | Average |
|  | 2 placed in gas phase region | Good | Good | Good |

Figure 17:
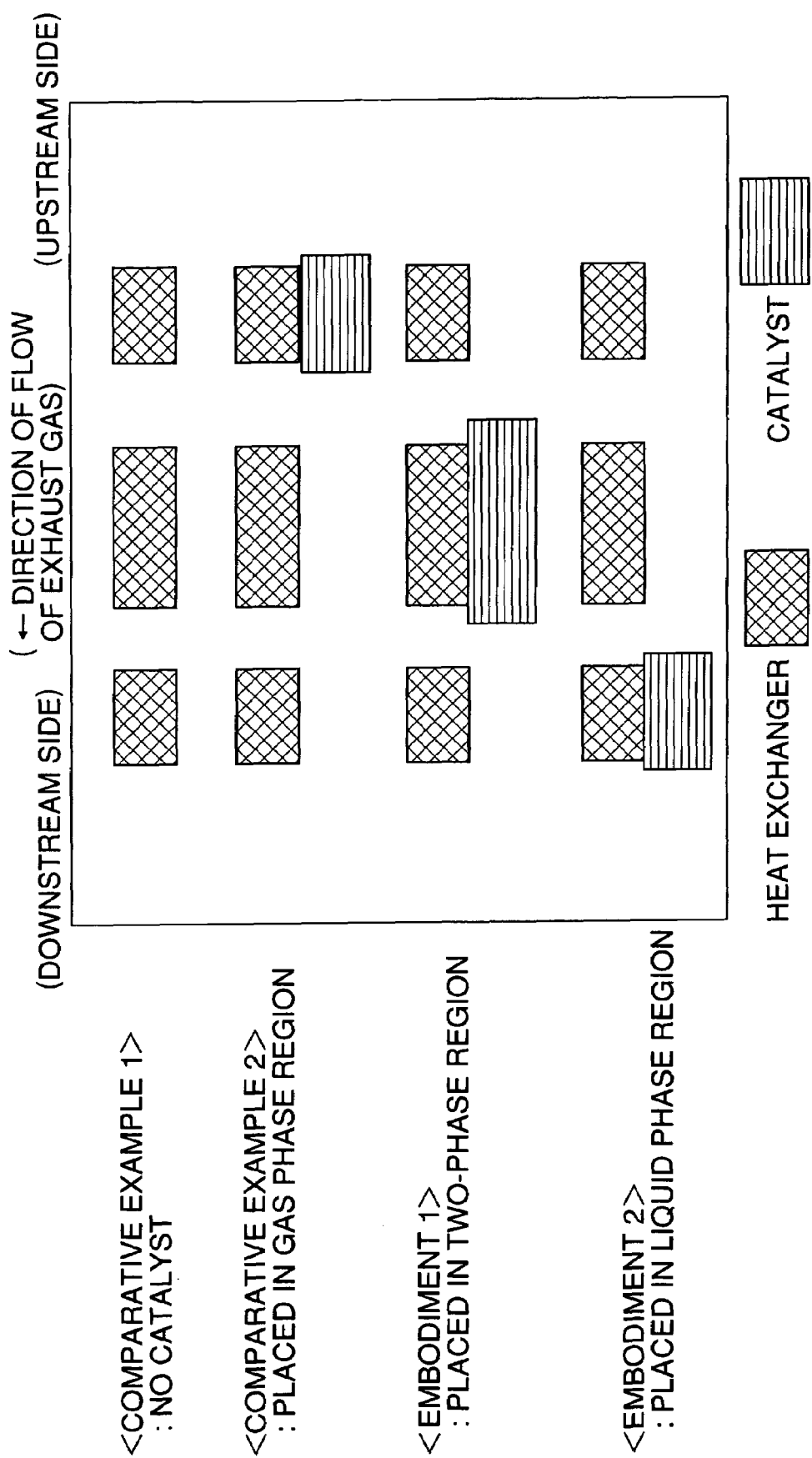

Table 1 and FIG. 17 show a first embodiment in which the first stage to fourth stage metal catalyst devices 46A to 46D were placed in the two-phase region, a second embodiment in which the first stage to fourth stage metal catalyst devices 46A to 46D were placed in the liquid phase region, a first comparative example in which there were no first stage to fourth stage metal catalyst devices 46A to 46D, and a second comparative example in which the first stage to fourth stage metal catalyst devices 46A to 46D were placed in the gas phase region. When both the durability of the catalyst at high temperature and the durability of the heat transfer tube of the heat exchanger against overheating were evaluated overall, it was found that the first and second embodiments were superior to the first and second comparative examples.

Although embodiments of the present invention are explained in detail above, the present invention can be modified in a variety of ways without departing from the spirit and scope thereof.

INDUSTRIAL APPLICABILITY

As hereinbefore described, the present invention can be applied to an internal combustion engine for any purpose in which a heat exchanger integrally including a catalyst device is disposed in an exhaust passage.

What is claimed is:

1. An internal combustion engine in which a heat exchanger (H1 to H5) having a catalyst device (46A to 46D) integrally provided therewithin is arranged in an exhaust passage (33), the heat exchanger (H1 to H5) carrying out heat exchange between an exhaust gas and a working medium in a condition where the heat exchanger (H1 to H5) and its catalyst device (46A to 46D) are in direct contact with the exhaust gas, and the catalyst device (46A to 46D) purifying the exhaust gas,
    wherein the catalyst device (46A to 46D) is disposed in a region where the temperature of the exhaust gas is higher than a temperature at which the catalyst is inactive, the region being in the vicinity of a position where the difference in the temperature between the exhaust gas and the working medium within the heat exchanger (H1 to H5) is the smallest,
    said heat exchanger including a plurality of sections connected serially to one another, the first of said plurality of heat exchangers for first receiving the working medium at a downstream end of a flow of exhaust gas and for delivering the working medium at an upstream end of the flow of exhaust gas, at least another one of said plurality of sections other than the first heat exchanger being disposed at a position wherein a temperature difference of the exhaust gas and the working medium is the smallest.

2. The internal combustion engine according to claim 1 wherein the catalyst device (46A to 46D) is disposed on the upstream side, relative to the direction of exhaust gas flow, of the position where the difference in temperature between the exhaust gas and the working medium is the smallest.

3. The internal combustion engine according to claim 1 wherein the catalyst device (46A to 46D) is disposed in a two-phase region of the working medium.

4. A heat exchanger for use with an internal combustion engine comprising:
    a plurality of heat exchangers being operatively mounted relative to an exhaust passage, said plurality of heat exchangers carrying out heat exchange between an exhaust gas and a working medium;
    a catalyst device operatively provided relative to at least one of the plurality of heat exchangers and being in communication with the exhaust passage for purifying the exhaust gas;
    said plurality of heat exchangers being operatively connected serially to one another, a first of said plurality of heat exchangers for first receiving the working medium at a downstream end of a flow of exhaust gas and for delivering the working medium at an upstream end of the flow of exhaust gas, at least another one of said plurality of heat exchangers being disposed at a position wherein a temperature difference of the exhaust gas and the working medium is the smallest;

wherein the catalyst device is disposed in a region where the temperature of the exhaust gas is higher than a temperature at which the catalyst is inactive, the region being in the vicinity of a position where the difference in the temperature between the exhaust gas and the working medium within the at least the another one of the heat exchangers is the smallest.

5. The internal combustion engine according to claim 4, wherein the catalyst device is disposed on the upstream side, relative to the direction of exhaust gas flow, of the position where the difference in temperature between the exhaust gas and the working medium is the smallest.

6. The internal combustion engine according to claim 4, wherein the catalyst device is disposed in a two-phase region of the working medium.

7. The internal combustion engine according to claim 4, wherein said first of said plurality of heat exchangers is disposed to surround an outer peripheral surface of an exhaust port for first receiving a flow of working medium while being the last of said plurality of heat exchanges exposed to a flow of exhaust gas.

8. The internal combustion engine according to claim 7, wherein a second of said plurality of heat exchangers is disposed to within said first of said plurality of heat exchangers for receiving a flow of working medium from said first of said plurality of heat exchanges while being the penultimate of said plurality of heat exchanges exposed to the flow of exhaust gas.

9. The internal combustion engine according to claim 8, wherein a third of said plurality of heat exchangers is disposed to within said second of said plurality of heat exchangers for receiving a flow of working medium from said second of said plurality of heat exchanges while being the third of said plurality of heat exchanges exposed to the flow of exhaust gas.

10. The internal combustion engine according to claim 9, wherein a fourth of said plurality of heat exchangers is disposed upstream of the flow of exhaust gas relative to the third of said plurality of heat exchangers for receiving a flow of working medium from said third of said plurality of heat exchanges while being the second of said plurality of heat exchanges exposed to the flow of exhaust gas.

11. The internal combustion engine according to claim 10, wherein a fifth of said plurality of heat exchangers is disposed upstream of the flow of exhaust gas relative to the fourth of said plurality of heat exchangers for receiving a flow of working medium from said fourth of said plurality of heat exchanges while being the first of said plurality of heat exchanges exposed to the flow of exhaust gas.

12. An internal combustion engine in which a heat exchanger (H1 to H5) having a catalyst device (46A to 46D) integrally provided therewithin is arranged in an exhaust passage (33), the heat exchanger (H1 to H5) carrying out heat exchange between an exhaust gas and a working medium in a condition where the heat exchanger (H1 to H5) and its catalyst device (46A to 46D) are in direct contact with the exhaust gas, and the catalyst device (46A to 46D) purifying the exhaust gas, wherein the catalyst device (46A to 46D) is disposed in a region where the temperature of the exhaust gas is higher than a temperature at which the catalyst is inactive, the region being in the vicinity of a position where the difference in the temperature between the exhaust gas and the working medium within the heat exchanger (H1 to H5) is the smallest, and the catalyst device and the heat exchanger are arranged in a side-by-side relation to each other so that the catalyst device and the heat exchanger are in contact with the exhaust gas at the same position with respect to a flow direction of the exhaust gas in the exhaust passage.

13. The internal combustion engine according to claim 12, wherein the catalyst device (46A to 46D) is disposed on the upstream side, relative to the direction of exhaust gas flow, of the position where the difference in temperature between the exhaust gas and the working medium is the smallest.

14. The internal combustion engine according to claim 12, wherein the catalyst device (46A to 46D) is disposed in a two-phase region of the working medium.

15. The internal combustion engine according to claim 12, said heat exchanger including a plurality of sections connected serially to one another, the first of said plurality of heat exchangers for first receiving the working medium at a downsteam end of a flow of exhaust gas and for delivering the working medium at an upsteam end of the flow of exhaust gas, at least another one of said plurality of sections other than the first heat exchanger being disposed at a position wherein a temperature difference of the exhaust gas and the working medium is the smallest.

16. The internal combustion engine according to claim 15, wherein the catalyst device (46A to 46D) is disposed on the upstream side, relative to the direction of exhaust gas flow, of the position where the difference in temperature between the exhaust gas and the working medium is the smallest.

17. The internal combustion engine according to claim 15, wherein the catalyst device (46A to 46D) is disposed in a two-phase region of the working medium.

* * * * *